June 20, 1939.  L. SCUSA ET AL  2,163,318
MANUFACTURE OF CONTAINERS AND THE LIKE
Filed Sept. 23, 1937   16 Sheets-Sheet 8
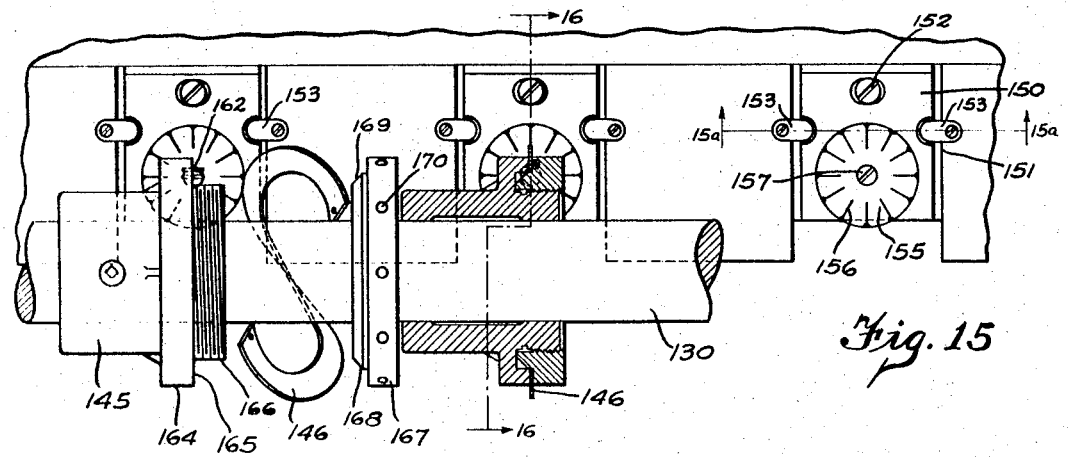
Fig. 15
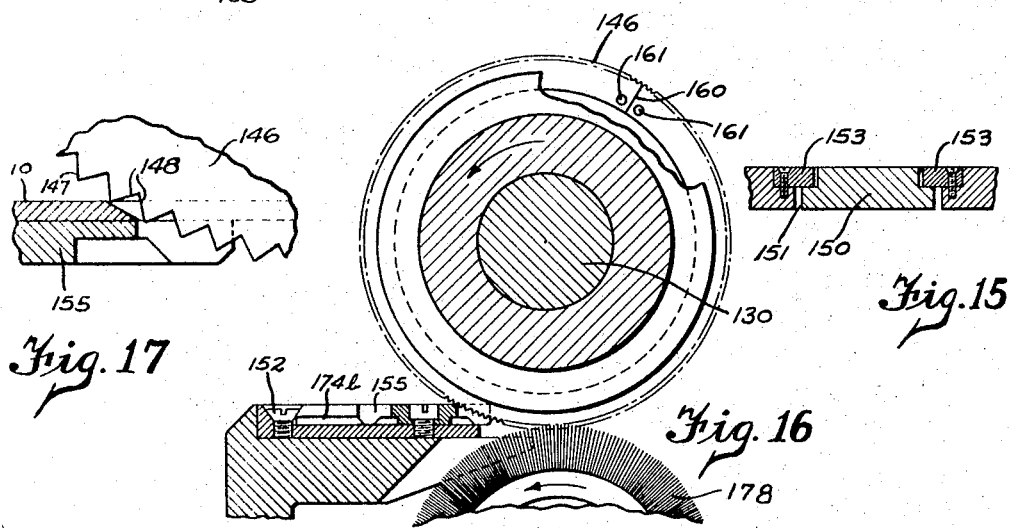
Fig. 17  Fig. 15a
Fig. 16
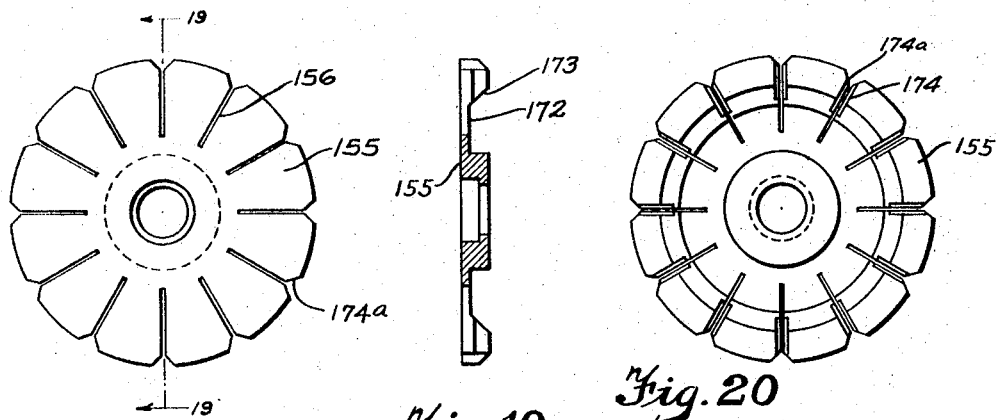
Fig. 18  Fig. 19  Fig. 20
INVENTORS
Lino Scusa and
Rudolph Kilian
BY Maréchal & Moe
ATTORNEYS

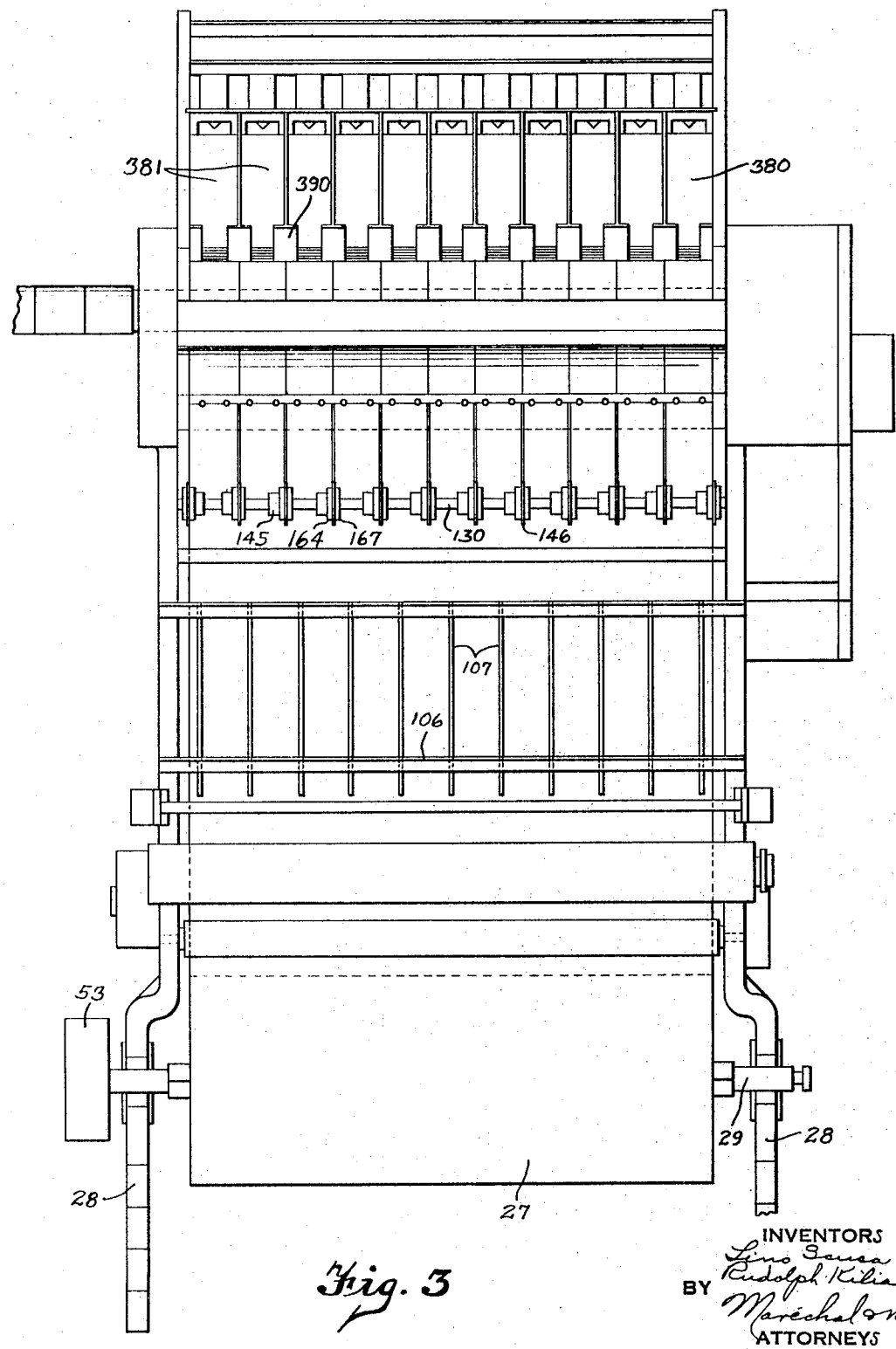

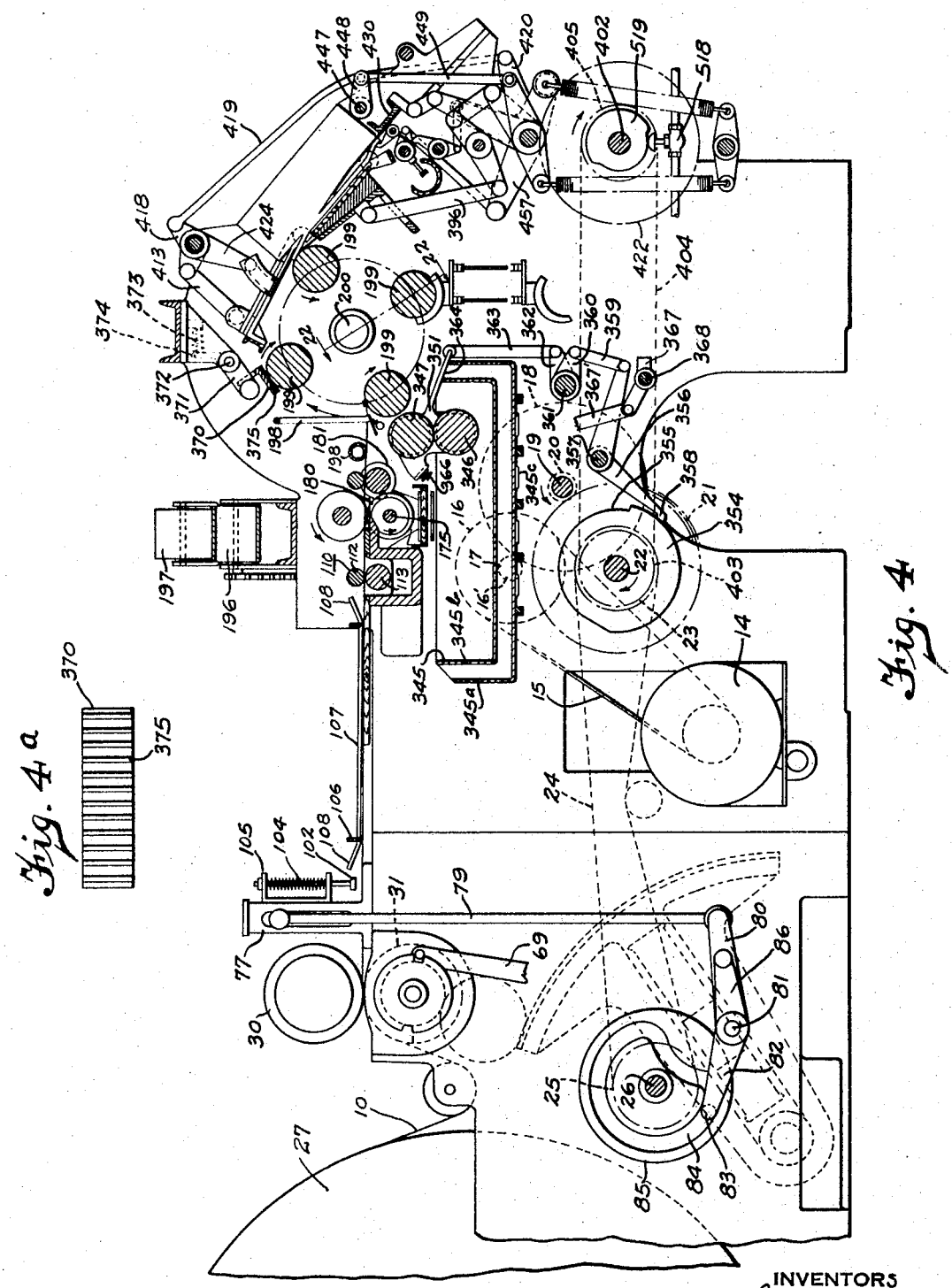

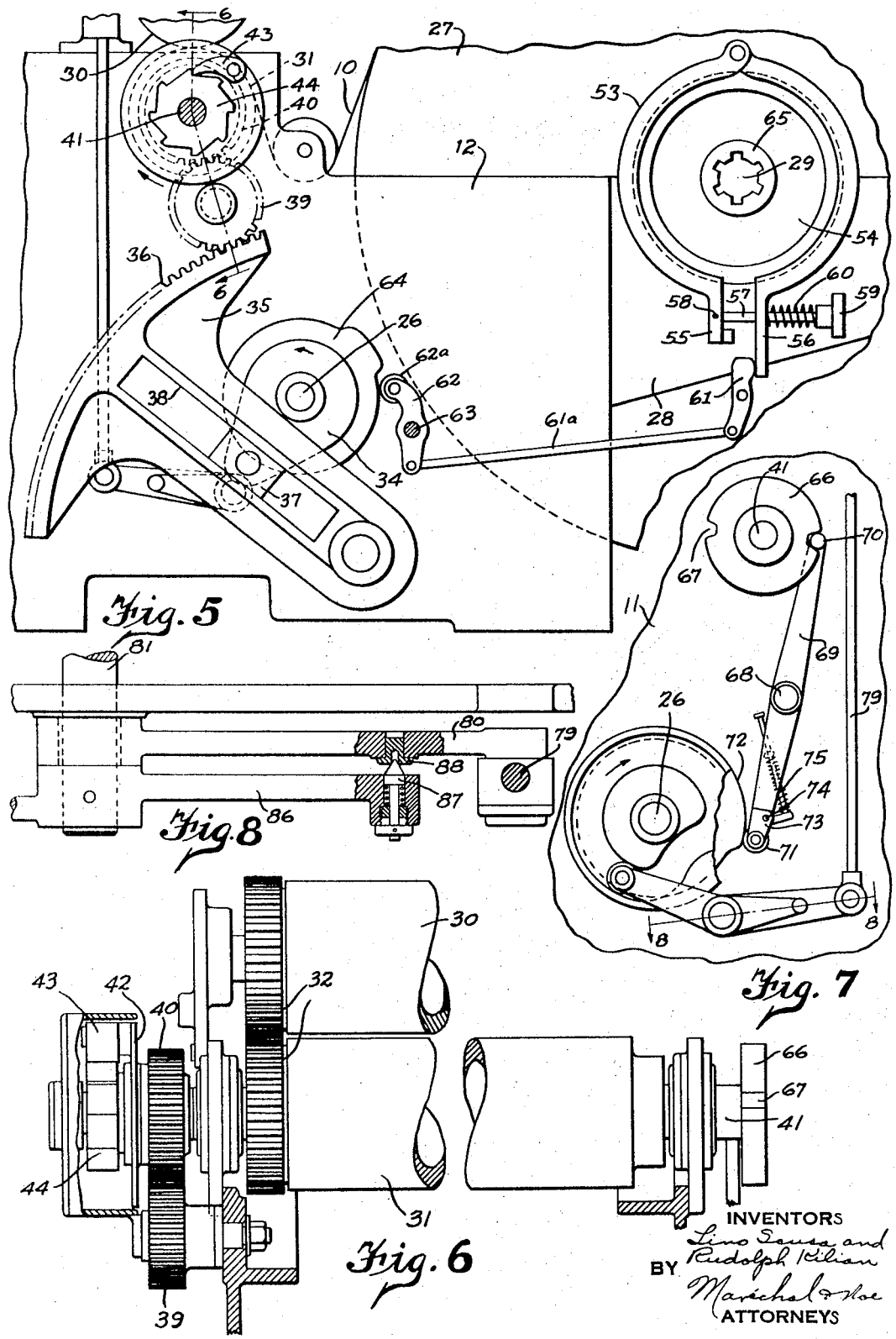

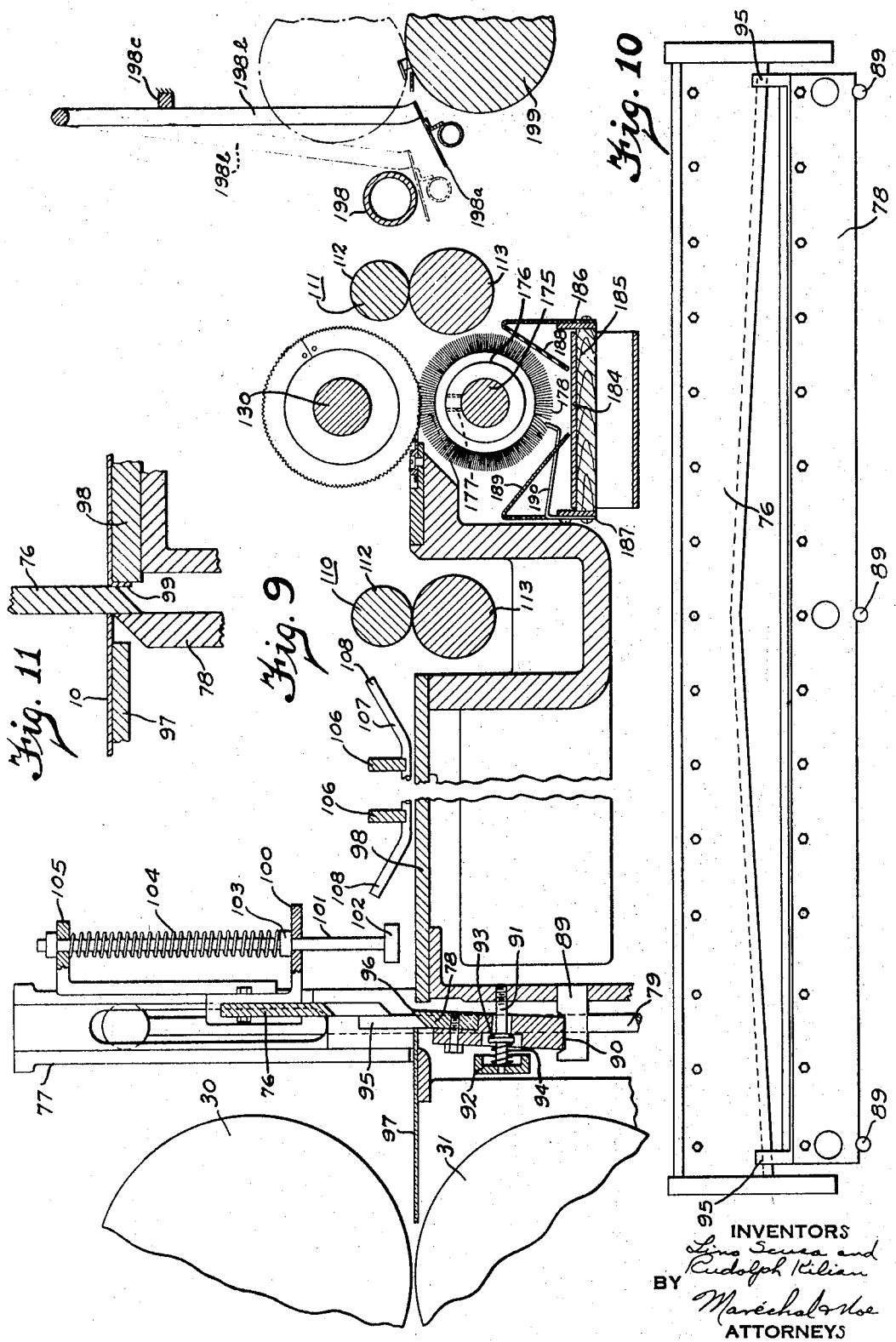

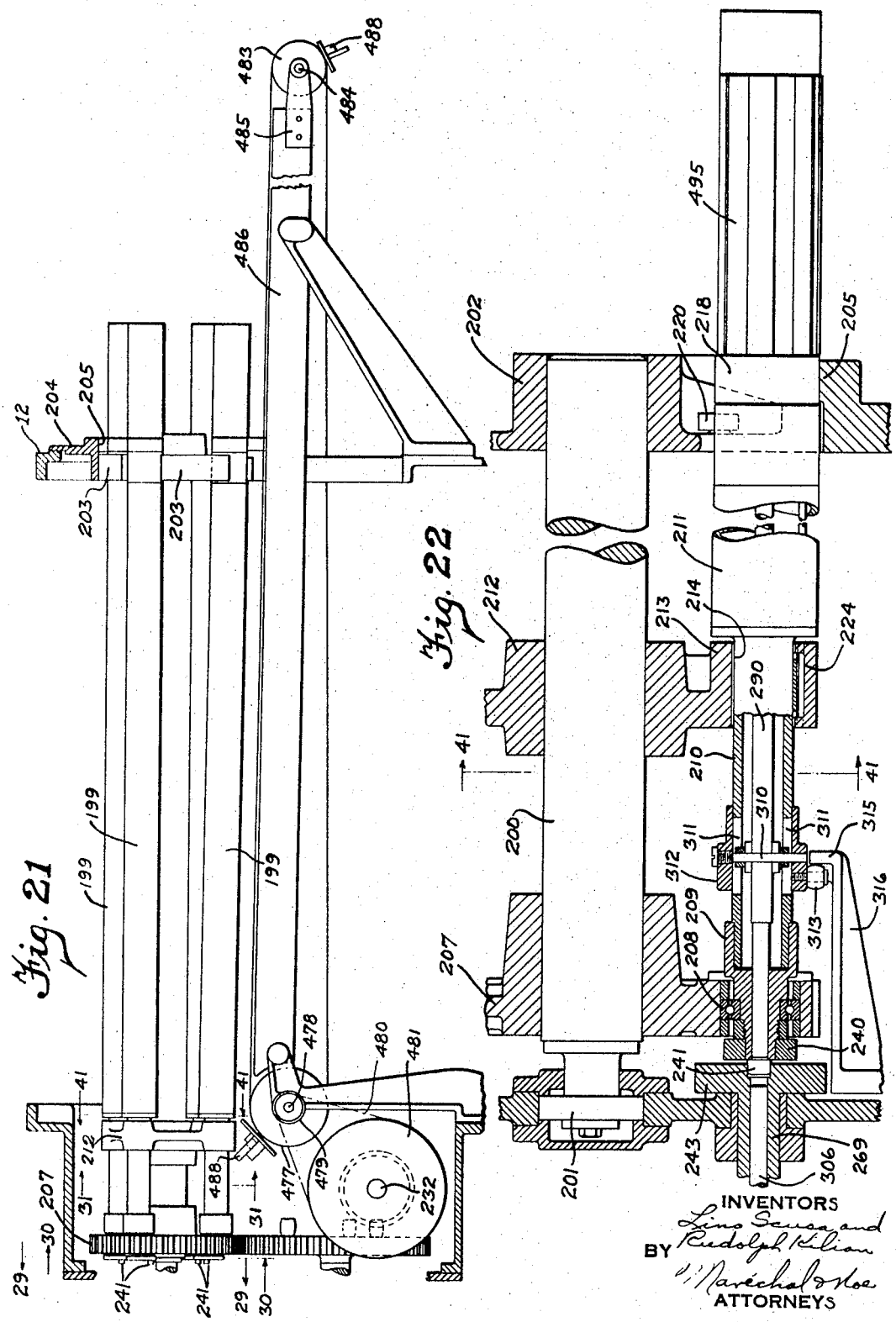

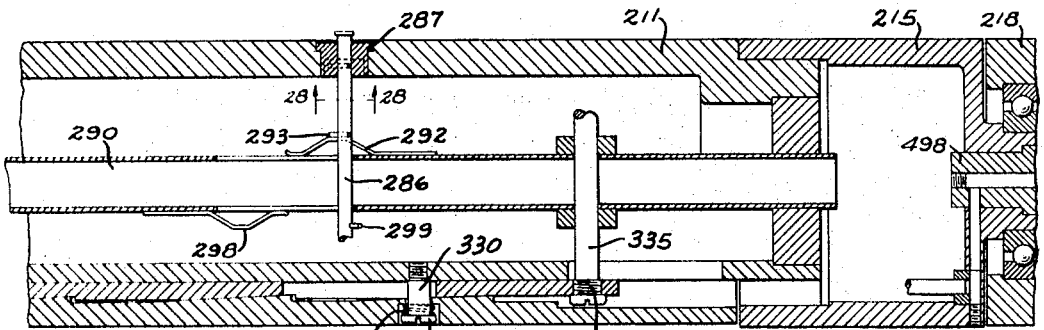
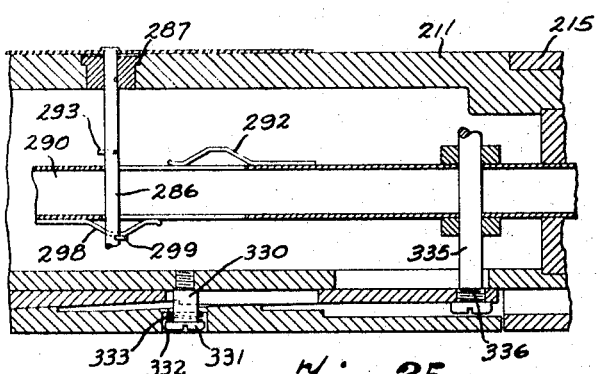
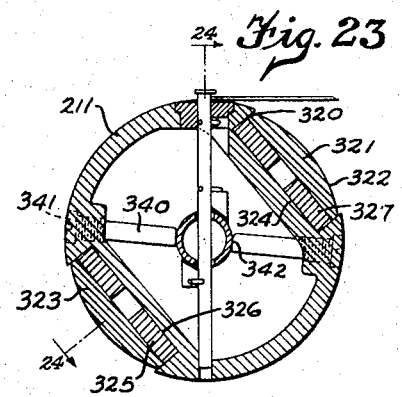
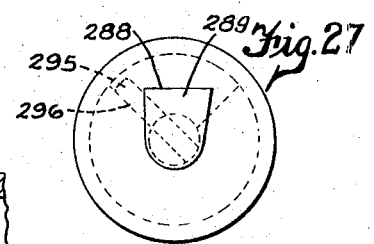
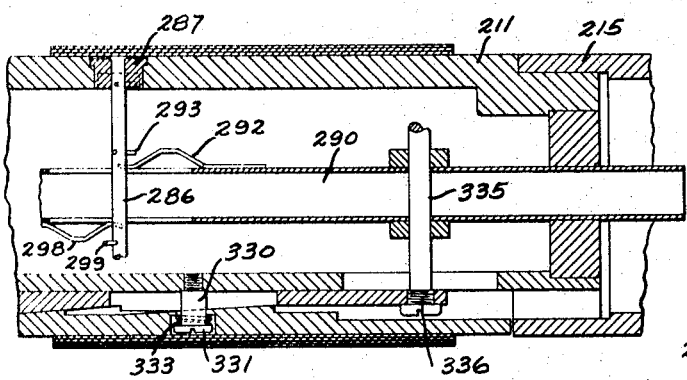
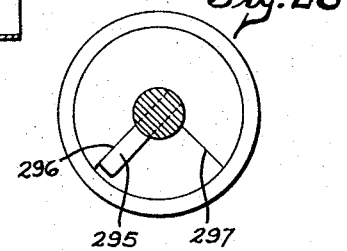

June 20, 1939. L. SCUSA ET AL 2,163,318
MANUFACTURE OF CONTAINERS AND THE LIKE
Filed Sept. 23, 1937 16 Sheets-Sheet 11

INVENTORS
Lino Scusa and
Rudolph Kilian
BY Marechal & Noe
ATTORNEYS

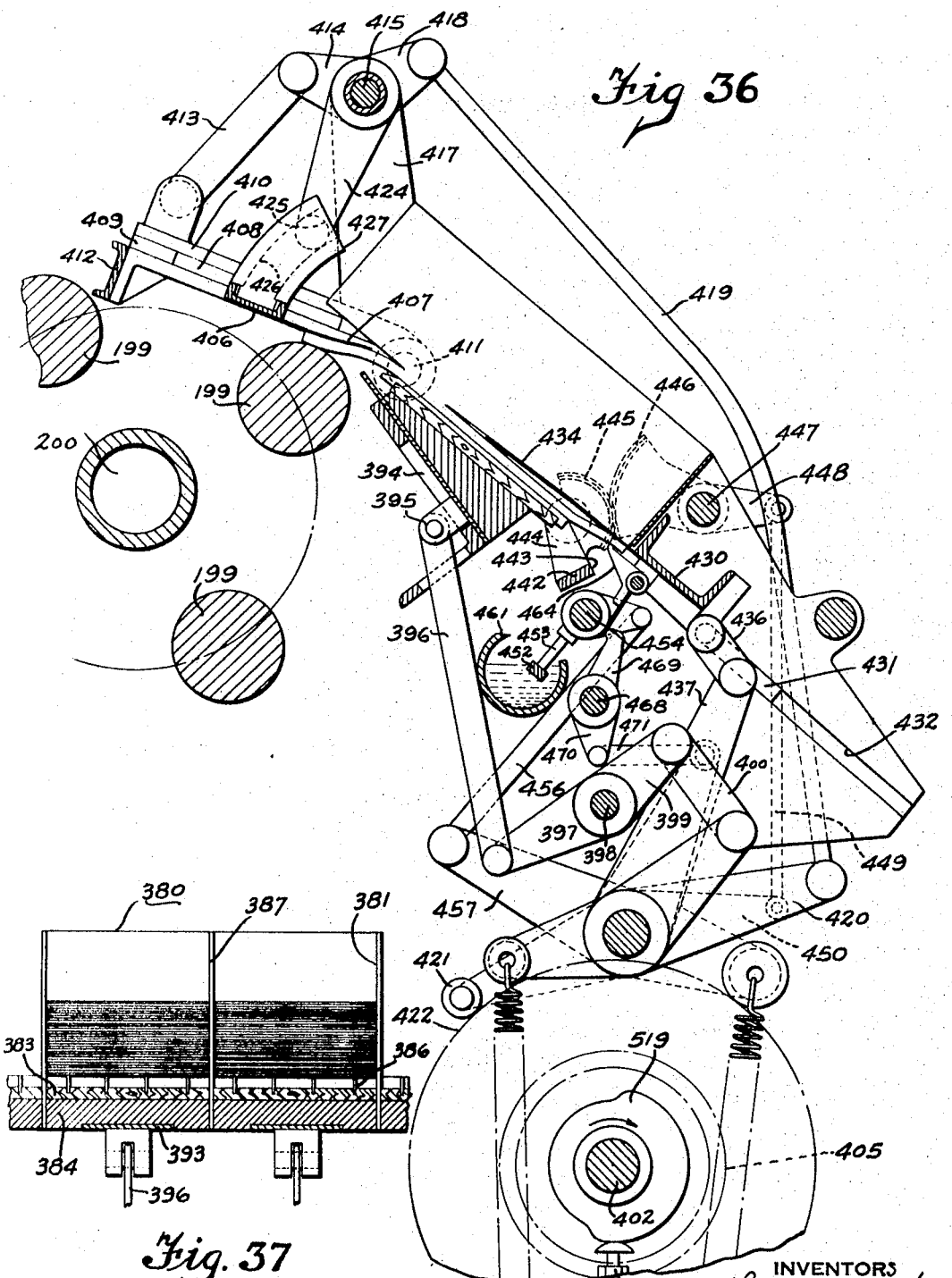

June 20, 1939.  L. SCUSA ET AL  2,163,318
MANUFACTURE OF CONTAINERS AND THE LIKE
Filed Sept. 23, 1937   16 Sheets-Sheet 15
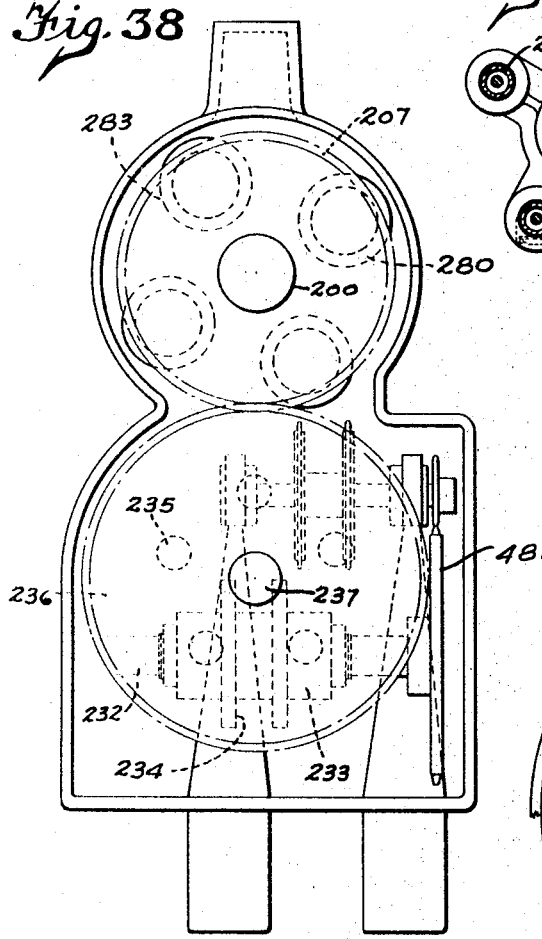
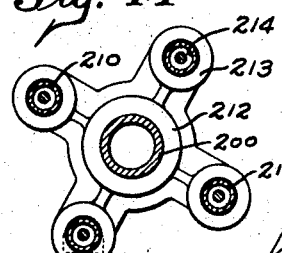
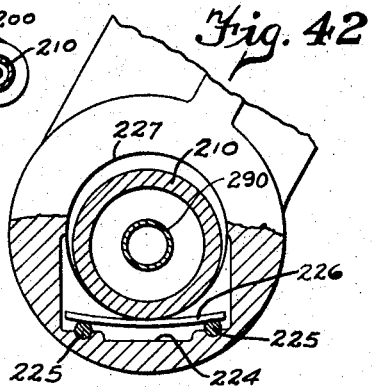
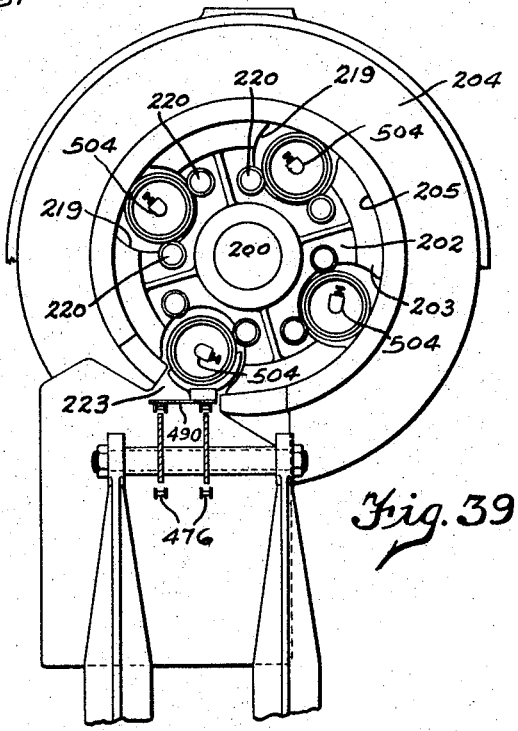
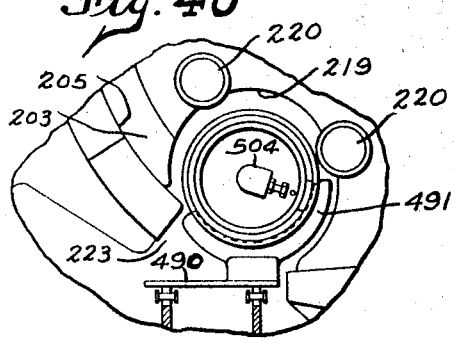
INVENTORS
Lino Scusa and
Rudolph Kilian
BY Marechal & Noe
ATTORNEYS June 20, 1939. L. SCUSA ET AL 2,163,318
MANUFACTURE OF CONTAINERS AND THE LIKE
Filed Sept. 23, 1937 16 Sheets-Sheet 16
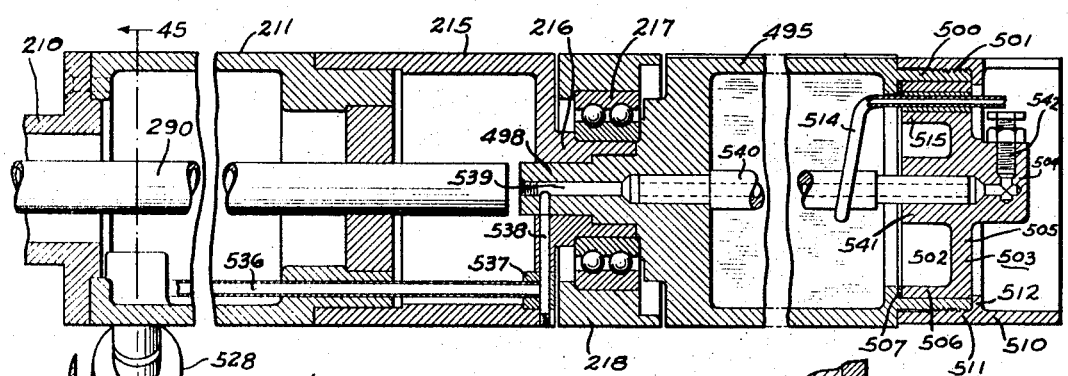
Fig. 44
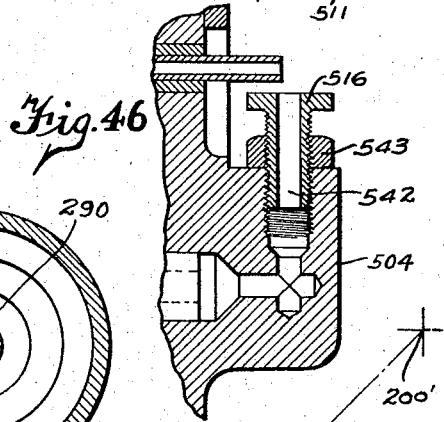
Fig. 46
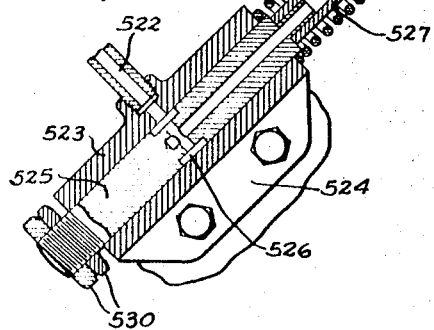
Fig. 45
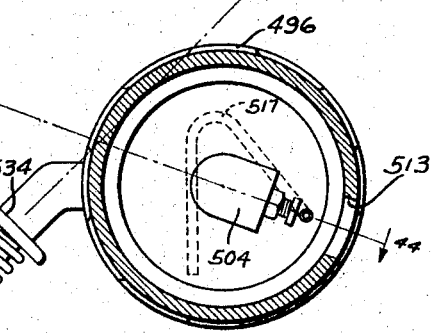
Fig. 43
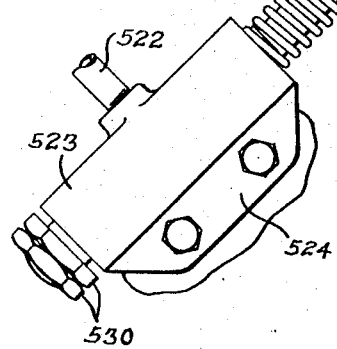
INVENTORS
Lino Scusa and
Rudolph Kilian
BY Maréchal & Noe
ATTORNEYS Patented June 20, 1939

2,163,318

UNITED STATES PATENT OFFICE 2,163,318

MANUFACTURE OF CONTAINERS AND THE LIKE

Lino Scusa, West Phoenix, and Rudolph Kilian, Baldwinsville, N. Y., assignors to The Gardner-Richardson Company, Middletown, Ohio, a corporation of Ohio Application September 23, 1937, Serial No. 165,352

45 Claims. (Cl. 93—81)

This invention relates to the production of containers, and more particularly to a paper or paper board body portion therefor that is convolutely wrapped and which, in the illustrated embodiment of the invention, is of cylindrical form.

Containers of the character here referred to comprise the body portion and attached end closures of suitable form.

While containers of this general character are adapted for many and varied uses, the invention has been particularly developed for the production of container bodies adapted to receive oil, or oily or greasy materials, paints and the like. Such container bodies are formed from paper material having surfacing thereon so that in the formed condition, with the end pieces in place on the body, a completely impervious interior surfacing is provided such as to prevent leakage or seepage of the contents of the container therethrough. Preferably the end pieces are formed of metal pieces crimped in place on the body portion to maintain the desired sealed relationship.

The invention provides for the production of container bodies as a continuous process beginning with a supply web and terminating with the completed body portions ready for delivery to subsequent assembly processes or the like. The arrangement is such that production is accomplished on a large scale by providing a progression of related operations and by simultaneously processing a large number of container bodies at each of the different operating stations.

The invention provides for the formation of container bodies from the paper in sheet form, either in separate sheets of a length sufficient to constitute the container body, or from a large jumbo roll of paper. In the embodiment illustrated the invention utilizes a jumbo roll having a diameter of the order of 48" and a width such that it may be separated into eleven body blanks each having a width of 5½" and with sufficient additional allowance for a strip of trimming along each edge. The roll has preferably been treated previously with suitable surfacing material to provide desired surface characteristics of greaseproofness or the like although the invention is equally useful in forming container bodies from paper material which has received no coating or only a partial or preliminary coating. The paper supply is fed into cutting mechanism which operates to cut the continuous web into strips of paper of proper size for forming the individual container bodies, and the combined plurality of strips comprising the total web width are then fed into forming position with respect to a forming mandrel assembly.

In the preferred embodiment to be described in detail herein, this mandrel assembly comprises a plurality of rotatable mandrels mounted upon a frame that is indexed sequentially through a series of operating stations comprising a winding station at which adhesively treated strips are formed into tubes, an ironing station at which the adhesively joined layers are effectively sealed, a third station at which an outer wrapper or label is applied, and a final station where the finished tubes are removed from the mandrel and at which the body inner seams may receive a sealing treatment.

It is here pointed out that although this invention is disclosed as comprising a mandrel assembly of four stations, the invention is not limited to any specific number and a greater or lesser number may be provided as required for a particular container to be formed.

Having now briefly outlined the nature of the disclosure, it is pointed out that one of the principal objects of the invention is to provide apparatus for forming container bodies of paper or paper-like material at high speed, accurately and uniformly, and requiring a minimum of attention in operation.

It is a further object to provide such an apparatus to receive a substantial number of strips of paper laterally adjacent each other and for winding said strips into container form on a winding means which at the conclusion of the winding operation is removed from the winding position to provide for further processing of the container bodies, and to leave the winding position clear for a subsequent winding operation.

It is a further object to provide such an apparatus for forming a plurality of container bodies as a continuous operation starting with a large or jumbo roll of paper.

It is a further object to provide such an apparatus adapted to utilize a web or roll of paper of substantial width, cut it uniformly and accurately into proper size strips for forming the container bodies, and to form a plurality of such bodies simultaneously and at high speed.

It is a further object to provide such an apparatus having a plurality of winding mandrels adapted to be successively brought into winding position with respect to the paper strips, and to be thereafter removed to a succeeding position for the reception of an outer wrapper or label.

It is a further object to provide such an apparatus having multiple mandrel means for forming container bodies and in which the mandrels and the container bodies formed thereon are definitely controlled as to their position and relationship throughout all stages of the formation.

It is a further object to provide an apparatus in which a plurality of container bodies are delivered from the forming machine in predetermined location and angular position such that the bodies are uniformly arranged and adapted for cooperation with a fluid sealing applying means.

It is a further object to provide a novel paper feed means for controlling the feeding of strips of paper into accurate relationship with the forming mandrel.

It is a further object to provide a novel paper cutting and slitting means adapted to form a clean and accurate cut the edges of the paper sheet being sharply defined and unfrayed.

It is a further object to provide a mandrel having simple and effective means for receiving and retaining the paper web during the winding into container form and for releasing the formed container for discharge thereof.

It is a further object to provide simple and effective means for applying adhesive to a strip of paper as it is being formed upon a mandrel in proper controlled relation to its forming cycle.

It is a further object to provide novel and effective means for applying an outer wrapper or label to a container body from a stack of labels to secure smooth and uniform application thereof in predetermined position upon the container.

It is a further object to provide a novel mandrel assembly including a plurality of mandrels each adapted to be permanently controlled in operation in a plurality of positions and providing in one position for free passage and stripping of the formed container bodies.

It is a further object to provide a novel method for forming, as a continuous operation, and at high speed, a plurality of container bodies from a single sheet or web of paper material.

Other objects and advantages will be apparent from the description, the accompanying drawings, and the appended claims.

In the drawings—

Fig. 3 is a plan view of the machine;

Fig. 4 is an elevational view, somewhat diagrammatic in character, and looking toward the right-hand side of the machine;

Fig. 4a is a detail view of the face of the presser member;

Fig. 5 is an enlarged fragmentary elevational view of a portion of the left-hand side of the machine and illustrates in detail a portion of the web feeding apparatus;

Fig. 6 is a fragmentary sectional view as indicated generally by the line 6—6 in Fig. 5;

Fig. 7 is an enlarged fragmentary elevational view of a portion of the feeding mechanism on the right-hand side of the machine;

Fig. 8 is a fragmentary sectional view as indicated by the line 8—8 on Fig. 7;

Fig. 9 is a fragmentary vertical section taken longitudinally of the machine showing the path of the paper web from the initial feed rolls to the winding mandrel;

Fig. 10 is a view taken transversely of the machine showing the cut-off knife assembly in elevation;

Fig. 11 is a fragmentary sectional view taken similarly to Fig. 9 and showing the knives in cutting position;

Fig. 15 is an enlarged fragmentary view looking downwardly toward the punching mechanism that separates the paper sheets into strips;

Fig. 15a is a vertical sectional view on the line 15a—15a of Fig. 15;

Fig. 16 is a sectional view as indicated by the line 16—16 in Fig. 15;

Fig. 17 is an enlarged fragmentary portion of Fig. 16;

Fig. 18 is an enlarged detail plan view of one of the dies of the punching mechanism;

Fig. 19 is a sectional view as indicated by the line 19—19 on Fig. 18;

Fig. 20 is an elevational view of the reverse side of the die;

Fig. 21 is a fragmentary view looking toward the delivery end of the machine and showing the mandrel assembly in elevation;

Fig. 22 is an enlarged fragmentary vertical section taken on the axis of the mandrel assembly and indicated by the line 22—22 in Fig. 4;

Fig. 23 is a sectional view taken transversely of a mandrel to illustrate the gripping and expanding mechanism;

Fig. 24 is a sectional view taken on the line 24—24 of Fig. 23;

Fig. 25 is a sectional view taken similarly to Fig. 24 illustrating the parts in a different position;

Fig. 26 is also a view taken similarly to Fig. 24 but showing the parts in a still different position;

Fig. 27 is an enlarged elevational detail of a gripping finger;

Fig. 28 is a fragmentary sectional view taken transversely of a gripper rod and as indicated at 28—28 in Fig. 24;

Fig. 36 is a view similar to Fig. 35 showing the parts at a different point in the cycle of operation;

Fig. 37 is a fragmentary sectional view as indicated by the line 37—37 on Fig. 35;

Fig. 38 is a fragmentary elevational view somewhat diagrammatic in character looking toward the right-hand side of the machine;

Fig. 39 is a fragmentary elevational view looking toward the left-hand side of the machine and illustrating more particularly that end of the mandrel assembly;

Fig. 40 is an enlarged fragmentary showing of Fig. 39;

Fig. 41 is a fragmentary sectional view of a portion of the mandrel structure as indicated by the line 41—41 in Fig. 22;

Fig. 42 is an enlarged fragment of Fig. 41 partly shown in section;

Fig. 43 is an enlarged end elevational view of a mandrel and is somewhat diagrammatic in character to more clearly illustrate the sealing spray structure;

Fig. 44 is a sectional view as indicated by the line 44—44 on Fig. 43; parts being broken away for clearness of illustration;

Fig. 45 is a sectional view as indicated by the line 45—45 on Fig. 44;

Fig. 46 is an enlarged fragmentary sectional view of the spray jet structure; the section being taken similarly to Fig. 44.

In the drawings, in which like characters of reference designate like parts throughout the several views thereof, the machine is illustrated as comprising a unitary frame structure so arranged that the various operating parts are properly maintained in operative relationship.

Figure 1:
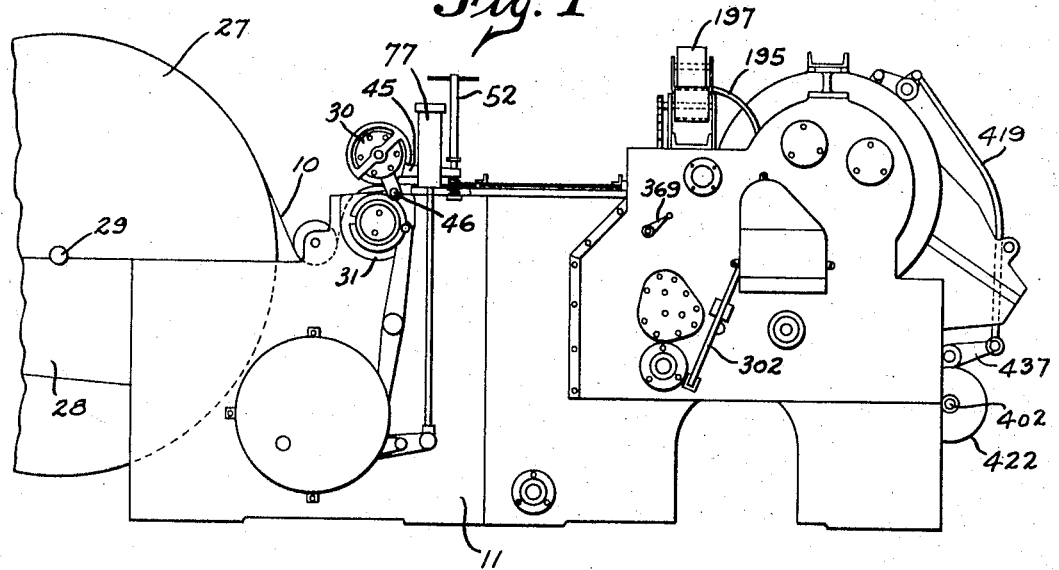
Fig. 1 is a side elevational view of the machine which, when considered from the supply or feeding end, may be designated as a right-hand elevational view.

This frame structure comprises main side members which are identified by the numerals 11 and 12. That side of the machine illustrated in Fig. 1 and identified as the right-hand side of the machine has the frame member indicated by the numeral 11, while that side of the machine illustrated in Fig. 2 and identified as the left hand side of the machine has the main frame member indicated by the numeral 12.

The machine organization is so set up that all of the several operating parts are actuated from a single power source which is the motor 14 (Fig. 4). As shown, the drive from the motor comprises a belt 15 to a pulley 16 that is fixed to a shaft 16' that carries a pinion 17. The shaft 16' projects through the left-hand frame member 12 and has affixed thereto a hand wheel 17' by which the machine may be moved manually. The pinion 17 meshes with a large gear 18 on a shaft 19 that also carries a pinion 20. The driving connection between the gear 18 and pinion 20 is selectively obtained through the medium of a clutch (not shown) that operates therebetween. The pinion 20 meshes with a large gear 21 that is fixed to a shaft 22 from which driving connection is made to several operating centers.

Included among the driving members on the shaft 22 is a sprocket 23 over which runs a chain 24 connecting to a sprocket 25 on a shaft 26 that serves to drive and control the web feeding mechanism and the cut-off knife. This mechanism is found in that portion of the machine adjacent the position of the paper supply which, in the illustrated embodiment of the invention, is a jumbo roll that is designated by the numeral 27 and is shown supported upon arms 28 that extend laterally from the ends of the frames 11—12. The arms are constructed to rotatably carry the shaft 29 of the supply roll.

As mentioned briefly above, the paper is given a surface coating to render it impervious to the passage of the container contents. In the case of containers that are to be used for an oily substance the surfacing is in the nature of a greaseproofing treatment and may comprise a composite layer of which the initial coating functions to impart flexibility and the final coating is principally greaseproof in character. Satisfactory results have been obtained where the greaseproof layer comprises a cellulose ester material such as nitro-cellulose and the coating surfacing formed in accordance with Swan Patents 1,957,368, 1,957,369, and 2,039,361, assigned to the same assignee as this application.

Referring now to the web feed and associated mechanism, numerals 30 and 31 designate respectively the upper and lower rolls of the feeding device through which the paper web 10 is drawn and is advanced into position to be sheared by a cut off knife into sheets having a dimension in the direction of feeding movement which is the peripheral length of the webs to be formed into the container bodies which are designated by the numeral 13. The feed rolls are intergeared as indicated at 32 and they are connected to an intermittently operated drive.

The power drive to the feed rolls is from the shaft 26 through a crank arm 34 to a rockable member 35 that incorporates a gear sector 36 (Fig. 5). The driving connection between the crank arm 34 and the member 35 comprises a slide block 37 that is reciprocable in a guideway 38 of the member 35. The gear sector 36 meshes with a gear 39 which in turn meshes with a gear 40 that turns freely on the shaft 41 of the lower feed roll 31. The gear 40 has fixed to it a plate 42 that pivotally mounts a pawl 43 that is adapted to engage the teeth of a ratchet 44 that is fixed to the shaft 41 of the lower feed roll. Rotation of the shaft 26 rocks the member 35 which results in advance of the feed rolls through the medium of the pawl and ratchet connection during one direction of travel of the member 35. This advancing movement is timed with respect to the other operations of the machine so that paper feed occurs at a proper time in the operating cycle of the machine.

Figure 2:
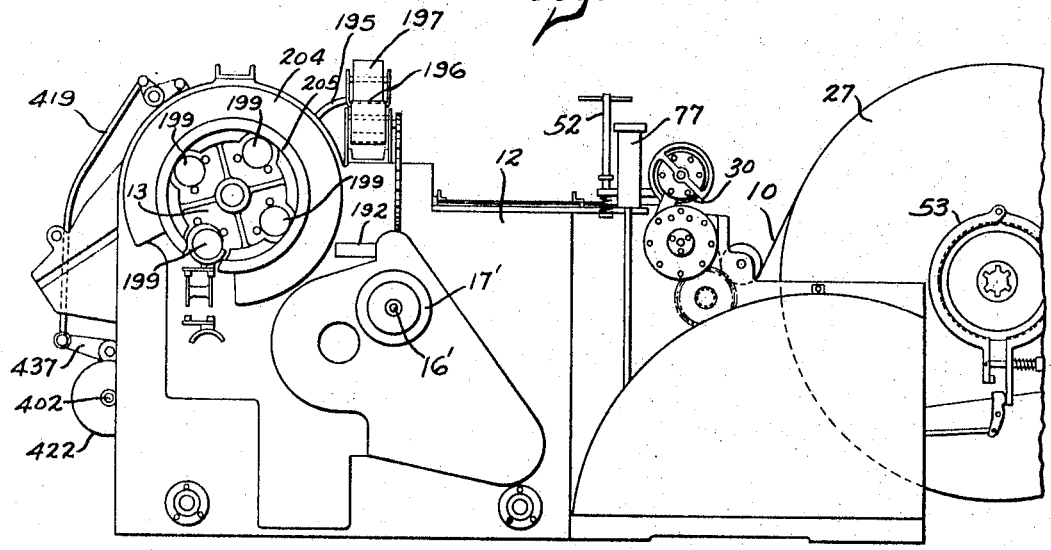
Fig. 2 is a similar elevational view taken from the opposite side of the machine and designated as a left-hand elevational view.
Figure 13:
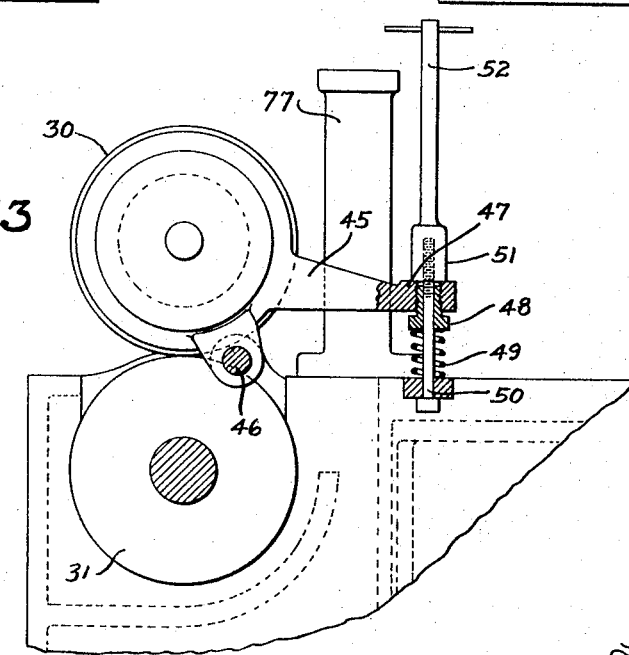
Fig. 13 is a fragmentary view illustrating the adjusting mechanism of the initial feeding rolls.

Because of the intermittent feed the supply roll is alternately in motion and at rest. The arrangement of the feed drive is such that the supply roll is gradually accelerated from the rest position to maximum travel and is gradually slowed down to the rest position. Consequently the supply roll movement is such as to minimize the possibility of slippage in the feed rolls. The mounting of the feed rolls is such that the spacing between them may be adjusted, and such that they may be urged together under tension to provide a positive drive. As shown in Figs. 1 and 13 the upper fed roll is carried in brackets 45 that are pivotally mounted at 46 on the side frames 11—12. The brackets have laterally extending arms 47 that are engaged by an adjusting mechanism provided on each of the said side frames. As shown, each arm has in the end portion a threadedly engaged and adjustable collar 48. Coil springs 49 are provided between the side frames and the under side of each collar and act to urge the brackets in a counterclockwise direction (Fig. 13) to bring the rolls forcibly into engagement. This movement is limited and is adjusted by a mechanism comprising a stud 50 which extends upwardly from a fixed positioning in each side frame through each of the collars 48 and has in threaded engagement at the upper end thereof a nut 51 terminating in an accessible operating end 52. The nuts 51 may be adjusted to any desired elevation and serve to limit the gap between the feed rolls. The spring tension acting against this stop position may be adjusted by movement of the collars 48 in the supporting arms. This device is additionally of service in that the nuts 51 may be run down on the studs to thus cause a wide separation of the feed rolls for initial threading of the paper web.

Utilization of a jumbo roll as a supply source permits continued operation of the machine for an extended period as the rolls as furnished may have a diameter of the order of 48 inches. To insure a maintained positioning of the paper supply with respect to the feed roll operation so that the supply roll may not overrun at the end of feeding movement and may not, as a result of some condition of overbalance existing in the roll, tend to turn backwards at the end of feeding movement the machine is provided with means to positively stop the supply roll at the termination of the feeding stroke. The stop means comprises a brake structure having operating connection to the shaft 26 so that a braking pressure is automatically applied to the supply roll upon termination of the feeding stroke. As shown in Fig. 5, the roll supporting arm 28 projecting from the frame member 12 carries a brake shoe structure 53 which encircles a brake drum 54 that removably engages the supply roll shaft 29. The brake shoe structure is arranged in the manner of a clasp brake and has parallel arms 55 and 56 extending from the remote ends of the clasp structure; the arm 55 being held to the machine frame as shown. These parallel arms, and the shoes attached thereto, are urged toward one another by provision of an adjustable spring tensioning device comprising a stud 57 pivotally connected at 58 to the arm 55 and threadedly carrying a handwheel 59 which bears against a spring 60 that is tensioned intermediate the handwheel and the arm 56. A pivoted lever 61 adapted to engage arm 56 has connected thereto a link 61a extending to an arm 62 that is pivoted on a stud 63 that is fixed to the machine structure. The arm 62 incorporates a roller 62a that engages a brake actuating cam 64 that is fixed on the shaft 26 and is rotatable therewith. The contour of the cam 64 is such that the spring 60 is compressed to effect release of the brake at the beginning of the feeding stroke to thus enable the supply roll to start and gain momentum with a minimum of resistance. The cam is preferably so formed that the brake is applied after the roll comes up to speed, thus exerting a continuing tensioning during the feeding of the web.

While discussing the brake structure it is pointed out that the arrangement here utilized is such that the supply rolls may be readily replaced without interfering with the brake assembly. This convenience in operation obtains by constructing the roll supporting shafts 29 with a splined end which is adapted to be engaged by a mating spline on a slidable collar 65 that is keyed to the brake member 54 and is axially movable with respect to that member; the arrangement being such that the member 65 may be axially withdrawn from the shaft to permit the application or withdrawal of a supply roll and, upon application of a fresh supply roll may be moved axially into operating engagement with the shaft wherein the brake is operatively connected to the supply shaft 29.

Means are provided to insure proper and accurate termination of feed roll movement at the end of the feeding stroke to thus avoid an overrun due to inertia. As shown in Fig. 7, the lower feed roll shaft 41 has affixed to the righthand end a disk 66 having diametrically opposed notches 67. The side frame 11 provides pivotal support at 68 for a rock member 69 having a roller 70 that is adapted to be received within the peripheral notches 67 to thus lock the feeding mechanism. The lower end of the member 69 carries a roller 71 that rides over the periphery of a disk cam 72 carried by the shaft 26. The contour of the cam 72 is such that the member 69 is rocked to bring the roller 70 into engagement with one of the notches 67 at the termination of the feeding stroke; the proportioning of the feeding parts being such that each feeding stroke comprises one and one-half revolutions of feed rolls 30, 31, and thus one of the notches is carried into proper registering position at the termination of each feeding stroke. The member 69 incorporates a safety device to prevent breakage in case the proper relationship of movements is not maintained. As shown, the roller 71 is carried by a short arm 73 that is pivoted at 74 to the member 69 and which additionally incorporates a spring tensioned connection 75 that resiliently holds the roller 71 in a fixed relationship with respect to the member 69. Although the roller 71 may move with respect to the arm 69 the tensioning of the spring is such that a fixed relationship is maintained during normal operating conditions.

As mentioned above, the knife that shears the supply web into sheets is actuated from the shaft 26 that controls the feeding movement. As shown, in Figs. 9 and 10, this knife structure comprises an upper movable blade 76 that stands transversely of the machine and is guided at its opposite ends within upright guide members 77 that are carried by the frame members 11 and 12, and a lower knife blade 78 that functions as a stationary blade.

Knife movement obtains through the medium of linkage connecting to a cam on the shaft 26. As shown, the knife 76 has links 79 pivotally connected to its opposite ends. These links are connected at their lower ends to rock arms 80 (Figs. 7 and 8) that are loosely mounted on a cross shaft 81 that extends through the machine parallel to and in the general vicinity of the driving shaft 26. These arms are driven from the shaft 81 which, as shown, has fixed to one end an arm 82 terminating at its outer end in a roller 83 that runs in the groove 84 of a cam plate 85 that is fixed to the shaft 26 and provides the actuating movement for the knife. The contour of the cam track or groove 84 is such that a proper reciprocating motion is afforded for the knife 76. The releasable drive is provided for one arm which serves to prevent damage to the knife and associated structure in case some obstruction is encountered to free movement, comprising an arm 86 that is fixed to one end of the shaft 81. This arm, at the outer end, incorporates a spring pressed plunger 87 which normally engages a socket 88 provided in the arm 80. The driving arm 82 at the righthand side of the machine is constructed integrally with the plunger carrying arm 86 of that side of the machine. At the left-hand side, direct connection is made to link 79, though a similar release may be included. During normal operation of the machine the arms 80 and 86 move in unison because they are so held by the engaged plungers and sockets. The holding force is sufficient that the driving relationship is not disturbed by normal operating forces but any unusually heavy load will cause the plunger to release so that the driving arm 86 may then move independently of the knife connected arms 80.

The arrangement of the knife structure is such that the supply web is separated into sheets by a very clean shearing cut. As shown in Fig. 10, the upper knife 76 is formed so that the cutting edge inclines downwardly in opposite directions from the midpoint of the blade. The cutting face of this blade is on the side from which the paper supply approaches the cut off station. The outermost ends of the upper blade are closest to the paper web and, upon blade actuation, the shearing operation begins at the opposite edges of the web and progresses toward the center. The lower blade 78, which is straight in the direction of travel of the supply web, is constructed so that the cutting edge is bowed somewhat and, as a result, the cooperating cutting edges of the blades stand inclined with respect to one another. The curvature of the lower blade, which obtains by forming the blade with a convex cutting face, is such that the midpoint of the blade stands ahead of the end portions a distance of the order of one quarter inch. The blade relationship is such that the shearing action closely simulates the action that obtains in a pair of hand shears. This blade relationship necessitates a mounting for the lower blade of such character that some freedom of movement is permited. As shown, the lower blade 78 is supported upon a plurality of laterally spaced studs 89 which project from the machine frame structure and which are notched along their upper edges as indicated at 90 to receive the blade. The lower blade is yieldingly held in contacting engagement with the upper blade and, as shown, has adjustably tensioned springs urging it toward that position. The tensioning means for the blade (Fig. 9) comprises studs 91 threadedly engaging the machine frame and spaced similarly to the supporting studs 89. These studs 91 pass through clearance openings in the lower blade and are provided at their outer ends with enlarged head portions 92 by which they may be grasped to impart an adjusting movement thereto. They each have loosely mounted thereon a collar 93 that bears against the blade under tension of a spring 94 which is positioned between the stud head portion 92 and the collar 93. The knife blades are maintained in properly related positioning during the interval of their separation by provision of upstanding fingers 95 at the opposite ends of the lower blade structure. These fingers are of sufficient length to overlie and engage the upper blade 76 when retracted.

The knife positioning is such that the cutting edge 96 of the lower blade lies at substantially the level of the table over which the paper web passes. As shown, this table comprises a relatively narrow portion 97 which extends from adjacent the main feed rolls 30—31 to adjacent the knife structure, and an additional table 98 which continues from adjacent the knife structure toward further feeding means. The relationship between the upper knife and the table portion 98 is such that the trailing edge of a severed sheet is bent downwardly by the descending knife in a manner that facilitates sealing the outer seam of the subsequently wound paper. As shown in Fig. 11, the table portion 98 terminates short of the cutting edge of the upper blade by an amount equal to the thickness of the upper blade plus the thickness of the paper web. The shearing operation therefore leaves an overlying short length of paper 99 which may be of the order of five-eights of an inch and which extends beyond the limits of the table 98 and which is bent downwardly over the edge of the table by downward movement of the knife. This bending of the paper is not necessarily so sharp as to produce what might be termed a scoring of the sheet but it is sufficient to cause the sheet end to retain a curved form which approaches the winding radius and thus lessens the tendency for the trailing edge of the wound container body to pull away from the adhesively joined adjacent surface.

A proper positioning of the paper sheet is maintained during the shearing and subsequent bending operation through provision of holding means carried by the upper knife and acting on the table 98. As shown in Fig. 9, the upper knife structure comprises an angle bar 100 which extends for substantially the length of the knife and which is pierced at spaced intervals to receive vertically extending rods 101 which terminate at their lower ends at a cross bar 102 having a length sufficient to traverse the operating width of the table and to serve as a presser bar during knife actuation. In the retracted position of the knife the bar 102 stands above the table and is held in such position through provision of stop collars 103 carried by the rods 101 and bearing against the member 100 through which the rods extend. Holding pressure for the bar is provided by coil springs 104 that are tensioned between supporting brackets 105 and collars 103. The positioning of the bar 102 with respect to the upper blade is such that a holding pressure is exerted throughout the shearing operation.

During advance of the paper web beneath the knife, and advance of the severed sheets to further processing, the paper is prevented from lifting from the table 98 by provision of a structure which overlies the table 98 and comprises a plurality of spaced transverse bars 106 that have affixed to the undersides thereof spaced longitudinally extending rods 107 beneath which the sheared sheets may pass; the rod ends being upturned as indicated at 108.

The sheared sheets, upon leaving the cut off knife, advance in timed relationship to the other operations to a mechanism (Fig. 9) where they are severed into laterally related strips having a width dimension that corresponds to the height of a container body. The nature of this operation is such that a narrow gap is formed between adjacent strips. During this operation the sheets are under the control of feeding means that exists at both sides of the slitting device and functions to maintain a proper positioning of the paper from the time it leaves the initial feed rolls 30—31 until it comes under the control of a mandrel upon which the strips are formed into cylinders. Referring now in greater detail to this feeding mechanism, it is pointed out that two pairs of vertically related rolls are provided which are spaced in the direction of paper travel and are designated generally by the numerals 110 and 111. The upper roll of each pair, designated by the numeral 112, is shown as being of somewhat smaller diameter than the lower roll 113. The rolls are positioned so that the paper web when advancing along the table 98 will readily enter the nip. These pairs of feed rolls have a common drive which is operated intermittently in timed relation to the other portions of the machine structure. As shown, the shaft 22 (Figs. 12 and 14) has fixed thereto a spur gear 116 which is of the form known as a mutilated gear having a blank tooth area of such character that an intermittent motion may be obtained therefrom. The gear 116 meshes with a pinion 117 that is freely rotatable on a shaft 118 and which has fixed thereto a gear 119. The gear 119 meshes with a pinion 120 that is freely rotatable upon a shaft 121 and which has fixed thereto a sprocket 122. The sprocket has running thereover a chain 123 that also passes over sprockets 124 that are provided on the end of each of the lower feed rolls 113. The dwell interval of the gear pair 116—117 is such that motion is imparted to the feeding rolls at a time and for a duration coordinated to the preceding feed and cut off operation and to the subsequent mandrel operation; the feed roll pair 110 being positioned with respect to the cut off knife so that the advancing edge of the feeding paper web comes under the influence of this feed roll assembly before the sheet is severed, consequently continuous control is maintained over the paper supply.

Figure 12:
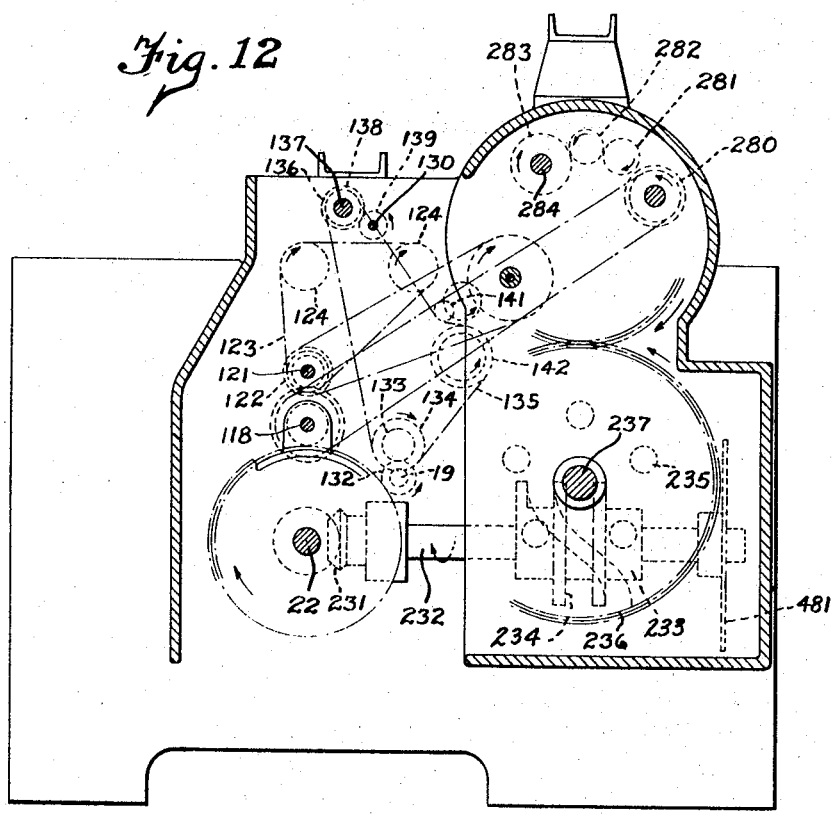
Fig. 12 is a fragmentary elevational view somewhat diagrammatic in character and looking toward the righthand side of the machine.

The separation of the sheet into strips is accomplished through the medium of a plurality of rotary punches that are carried upon a rotatable shaft mounted transversely of the machine and indicated by the numeral 130 (Figs. 9, 12, and 15 to 20). This shaft is operated from the common power source and has a driving connection such that it is maintained in continuous rotation. As shown in Fig. 12, the shaft 19 has fixed thereon a pinion 132 which meshes with a gear 133 that has fixed thereto a sprocket 134 over which runs a chain 135 that also passes over a sprocket 136 that turns on a stub shaft 137 and has fixed thereto a gear 138 that is in meshing engagement with a gear 139 that is fixed to the continuously rotatable punch shaft 130. The traverse of the chain 135 also includes an idler sprocket 141 and a sprocket 142 having operating connection to an adhesive applying device which will be described later.

The continuously rotating shaft 130 has provided thereon a plurality of collars 145 that are spaced axially in accordance with the paper strip widths and which removably carry circular punches 146 in positions such that the peripheral faces thereof cut through the plane of the paper supporting table at a desired transverse spacing. These punches are relatively thin, having a thickness of the order of twenty thousandths of an inch (.020") and they cooperate with dies that are positioned at the elevation of the table; the construction and relationship of the punches and dies being such that the lines of separation of the paper strips are unusually clean and free from frayed edges so that an effective winding operation obtains and so that the ends of the wound tubes are smooth and are of such form that the subsequent end capping operations may be readily performed, and tendency for wicking of the ends avoided.

The superior cutting operation obtains by constructing the punch members 146 with a serrated periphery that functions as a punch, and by rotating the members in cooperating relationship with close fitting dies that lie at the plane of paper travel. As shown, the members 146 have a serrated peripheral edge generally simulating a saw-tooth form of which, in the illustrated embodiment of the invention, the angle of tooth face is such that the punches are constructed with the faces of the teeth symmetrical with respect to a radial line. As shown in the enlarged diagrammatic Fig. 17, the positioning of the punch shaft 130 and the face angle of the teeth on the punches is such that at engagement of the punch periphery with the plane of the paper travel the teeth strike through the paper web with the point 147 of any given tooth face 148 leading. That is, the tooth end is lowermost and strikes the paper first. This angle of attack, coupled with a rate of advance for the paper which is relatively slow as compared to the rate of travel of the punch periphery produces an action that is in the nature of a nibbling or successive punching of the paper sheet. The bite of each successive punch tooth is small, and the amount of paper removed by each is likewise small, producing a sharp and clean cut edge.

Referring now more particularly to the specific embodiment of the invention and to afford an example of the relationship of speed and feed described above—the rotary punch members 146 have a diameter of four and three-sixteenths inches (4-3/16"). The tooth spacing is of the order of one sixteenth (1/16) of an inch. The shaft of the punch members rotates about 140 R. P. M. and therefore the peripheral travel of the punch members is of the order of 150 feet per minute. The advancing rate of the paper sheets across the punch members is of the order of 100 feet per minute. From this expressed relationship it is apparent that the bite of each punch tooth is a very small amount. The result obtained from such operation is a smooth, clean cut edge that is free from frayed portions or the objectionable bulging that results from the distorting forces present in the usual slitting operation.

The die structure comprises die receiving plates 150 which are adjustably spaced within table depressions 151 in accordance with the positioning of the collars 145. Each die plate is held to the table through provision of a locking screw 152 and positioning pins 153; the screw and pins being received within laterally enlarged slots in the plate to permit of adjustments. Each plate has a circular depression therein within which is received a die 155 that is shown as being of circular contour having a plurality of selectively usable radial punch receiving slots 156 therein. The dies 155 are held in place within the plates through provision of locking screws 157.

The construction of the punches 146 is such that they may be produced so inexpensively that they may be economically discarded at the end of their operating life. In addition, they are of such construction that they may be readily applied to or removed from the shaft 130 without necessitating an extended shut-down of the machine. For these reasons a high operating efficiency in the machine may be readily maintained as sharp punches may be quickly and inexpensively substituted for those that become dull. As shown, the punch members 146 are of ring-like form and are separated along a radial line as indicated at 160. Closely adjacent the line of separation the two end portions are pierced as indicated at 161 for engagement with pins 162 that are carried by each supporting collar 145 and which serve as a driving means. The collars 145 that serve as mountings for the members 146 each have a peripheral flange 164 with a machined face 165 against which the member 146 lies and from which the pins 162 project. A threaded portion 166 extends beyond the face 165 for reception of a holding ring 167 by which the punch is clamped and which has an annular projection 168 that is telescopically received within an annular opening in the collar. The outer diameter of the projecting part 168 is such that the member 146 is closely received thereon. The outer edge of the projection 168 is beveled as indicated at 169 so that interfitting of the member 146 is readily accomplished. Each ring 167 has peripheral notches 170 for application of a wrench whereby the member 146 may be securely clamped in place. As shown, the spacing of the collars 145 on the shaft 130 is such that the rings 167 may be moved from assembled position to a clearance position a substantial distance away from the collar; the gap being such as to permit of assembly of the punch members which, as illustrated, are freely distortable so that they may be passed over the shaft 130 during assembly or removal. The punches, by having a tooth form that is symmetrical with respect to a radial line on the punch, are reversably receivable in assembly.

The construction of the dies 155 is likewise such that machine operation may be maintained for extended periods without material shut-down delays. As shown, each of the circular dies has a plurality of radially arranged slots 156 with which the members may interfit. When the edges of one slot become dull it is a very simple operation to substitute another as, to make the substitution, it is only necessary to remove the die by withdrawing the screw 157 and to shift the die angularly to present a new and sharp cutting position. Further, the dies are quite small and represent but an insignificant investment and consequently may be entirely replaced at no great cost. The construction of the die is illustrated in detail in Figs. 18 to 20. As shown, the underside of the die has an annular recess 172 of which the outer face is beveled as indicated at 173. The purpose of the annular recess is to permit some deformation of the die during the hardening treatment; the action here being such that the die periphery is bowed downwardly. Upon assembly of a die in operating position the slightly bowed form of the die provides a clamping action upon tightening the center screw 157. The slots 156 are chamferred along the lower face as indicated at 174 for proper clearance, and are also chamfered along the peripheral edge as indicated at 174a. A locking pin 174b having tapered ends is pressed, upon the tightening of screw 152, into holding engagement with the lower beveled edge of the die.

While considering the separation of sheets into strips it is here pointed out that a clutch (not shown) is provided on the shaft 19 which permits release from the power source of all of the driven mechanism except that which drives the chain 135 that operates the slitting shaft 130 and the adhesive applying mechanism at the winding mandrel. By provision of this clutch it is possible to bring the punch shaft to operating speed before any feeding movement of the paper takes place.

Mechanism is associated with the punching operation to maintain the punches free of chips. As shown in Fig. 9, a shaft 175 extends transversely of the machine below the shaft 130 and beneath the plane of the table 98. This shaft 175 has provided thereon a plurality of brushes of circular form which are positioned in accordance with the punch spacing, and which serve to brush over the punches and thus dislodge any chips therefrom. A brush assembly comprises a collar 176 having adjusting means in the form of a set screw 177 whereby a desired positioning of the brush may be maintained. The brush bristles 178 extend radially from the mounting collar 176 and are of such length to extend some distance past the periphery of the punches. The brush shaft is driven from one of the feed rolls 110—111. As shown diagrammatically in Fig. 4, the brush shaft 175 has mounted thereon a gear 180 which meshes with a gear 181 that is fixed to the lower roll 113 of the feed roll pair 111. This driving relationship, as shown in Fig. 4, provides for counterclockwise rotation of the brush shaft and imparts to the brushes a movement which, at the point of engagement with the punches, is in a direction opposite to that of the punches.

A conveyor is provided to carry away the chips and like refuse. The conveyor travels transversely to the director of travel of paper through the machine and serves to carry this material to a point of delivery outside of the machine structure. As shown in Fig. 9, the conveyor is arranged as an endless belt that is mounted upon laterally spaced rollers and is arranged so that the upper reach, which is designated by the numeral 184, traverses a path closely beneath the brush assembly. The upper reach of the conveyor is supported upon a frame 185 having upwardly projecting rails 186 and 187 at the opposite side edges of the conveyor belt. The upwardly projecting side edges have affixed to them guides or chutes 188 and 189 which are constructed of sheet metal or the like and are formed to collect and direct the chips onto the conveyor belt. The rail 187 additionally carries a projecting arm 190 for each brush which extends into the brush and serves as a means of dislodging any chips or like particles from the brush during its rotation. The conveyor has an operating connection to the shaft 22 and, upon operation, discharges through an opening 192 (Fig. 2) at the side of the machine to which further conveying means may be attached for disposal of the refuse.

At this time it is pointed out that each side edge of each of the paper strips is subjected to a shearing or punching operation so that all strips will be of a predetermined width. This necessitates the use of a supply web having a width dimension something in excess of the accumulated dimension of the strips, and also necessitates the provision of slitting punches for both outside edges of the web. The web is usually of such width that but a narrow margin is removed from each of the edges. Additional conveyor means are provided to carry away the relatively narrow strip that is cut from the outer opposite faces of the end strips along the margins of the web. As shown, this conveyor structure comprises curved hollow tubes 195 having their lower ends adjacent the end punches and having their upper ends opening closely adjacent the upper reach of a belt conveyor 196. As shown, the belt conveyor 196 extends transversely of the machine at a point above chip conveyor 184. The relatively narrow strips that are sheared from the sheet margins are directed into the tubes 195 at the opposite sides of the machine and feed therethrough to the exit ends where they are directed onto the conveyor belt 196. Rollers 197 are provided on the conveyor adjacent the points of discharge of the tubes 195 and assist in directing the waste strips onto the belt 186 which discharges at the side of the machine.

Before terminating the description of that portion of the machine having to do with the presentation of paper strips to the mandrels it is pointed out that in the illustrated embodiment of the invention the machine is arranged to produce container bodies having a diameter of four inches. As mentioned, the body comprises three full turns of paper plus an overlap. The strip length is 39¼ inches, and the proportioning of the machine parts is such that the initial cut off is performed as the leading edge of the paper web 10 approaches the position of the mandrel upon which the strips are to be wound. Referring now in greater detail to the operating cycle of these parts—the feed roll pairs 110 and 111 are rotating to receive and advance the leading edge of the web being fed from the initial feed rolls 30—31. When the web has advanced to the point of cut-off all feeding stops to permit the cut-off knife to operate. Promptly following knife operation the feed roll pairs 110 and 111 resume and at the same time mandrel rotation begins. After a proper dwell the initial feed, comprising the rolls 30—31, is resumed to repeat the operation described. All of the feed rolls mentioned above have the same peripheral speed.

Although the momentary dwell for cut-off occurs while the punches are engaged in separating the web into strips the quality of work performed is in no way adversely affected because the punches have no set and because the web is securely held at opposite sides of the punching station by the feed roll pairs 110 and 111.

As mentioned above, the same feed device, comprising the feed roll pairs 110—111, that conveys the paper sheets beneath the punch shaft 130 serves additionally to advance the paper strips to a mandrel for subsequent winding and further processing. During movement between the feed rolls 111 and the mandrel the strips are guided under a fixed guide 198 (Fig. 9) and over a pivotally mounted plate 198a which extends closely adjacent the winding mandrel, the webs feeding directly into the mandrel grippers. Plate 198a is carried by a pair of arms 198b which provide for the swinging of the plate out of the way during indexing of the mandrels, a stop 198c limiting the movement of the plate by gravity toward the mandrels. The machine has a plurality of mandrels that are arranged in assembly such that they are successively advanced to different operating stations. The mandrels bear the general designation 199. In general, the mandrel stop positions comprise first a winding station, secondly a sealing or ironing station, thirdly a label applying station, and finally a stripping station wherein the container bodies are removed. The mandrels are incorporated in an assembly comprising a central supporting shaft 200 around which the mandrels stand in uniform angular spacing. As shown, four mandrels are provided and consequently a mandrel occupies each of the operating stations during each dwell interval.

Referring now to the general arrangement of the mandrel assembly, and more particularly to Figs. 21, 22, 38 and 39, it is pointed out that the mandrel assembly is rotatable about the central shaft 200 as an axis and additionally each mandrel is rotatable on its own axis. The central shaft 200 is supported for rotation at its right-hand end in a bearing 201 suitably mounted in the frame structure of the machine, and at the left hand end has fixed thereto a spider shaped member 202 of which the rim portion is arranged as spaced circular segments 203 that turn within a member 204 supported from the frame member 12 and having a circular opening therein defined by the rim 205 which serves as a bearing for the curved segments 203 of the member 202. Fixed to the shaft 200 closely adjacent the bearing 201 is a large spur gear 207 that serves as a portion of the mandrel indexing mechanism and additionally incorporates bearings for rotational support of one end of the mandrels therein. As shown particularly in Fig. 22, the right-hand ends of the mandrels are carried in the gear 207 by self-aligning ball bearings 208 for rotation therein, and in such a manner that some slight amount of angular travel is permitted; this last mentioned movement occurring during the process of stripping the containers as will be brought out below. As shown in Fig. 22, that portion of the mandrel that is received within the bearing 208 incorporates an annular collar 209 which telescopically receives a sleeve-like part 210 having a diameter materially less than the body portion of the mandrel which receives the paper strips and which is designated by the numeral 211. Axially spaced a relatively short distance from the gear member 207 is a spider like member 212 (Fig. 41) having radially projecting arms 213 incorporating passages 214 of sufficient diameter to freely admit the mandrel portions 210 with some clearance. The mandrel portions 210, on the side of the member 212 remote from the gear 207, are interfitted to the main mandrel paper receiving portions 211. Each mandrel portion 211, which is that part upon which the paper strips are received, extends for the full operating width of the machine which in the present instance is such that eleven container bodies may be wound simultaneously in side by side relationship.

The winding portion of each mandrel (Fig. 44) terminates at the left hand side of the machine in a fitting 215 having a tubular portion which telescopically engages the end of the mandrel portion 211, and having an axially extending end part 216 upon which is mounted an anti-friction bearing 217. The bearing 217 has fixed to its outer race a roller 218 having a diameter substantially the same as that of the winding portion of a mandrel and having a face portion of material axial length. This bearing, of which one is provided for each mandrel, functions as a part of the mandrel supporting structure and engages the rim face 205 of the member 204. The spider shaped member 202 (Figs. 2, 39 and 40), which is notched as indicated at 219 for passage of the mandrels, carries pairs of anti-friction bearings 220 at each mandrel position which are placed to engage and support the mandrels in positions axially related to the shaft 200. This axial relationship is maintained throughout the rotational travel of the mandrel assembly except at the stripping station where the construction is such that the mandrel occupying this position is dropped at its left hand end to a clearance position with respect to the supporting structure to permit withdrawal of the container bodies. This operation obtains by providing a slot or gap 223 in the lower part of the ring-like supporting member 204 which, as mentioned above, incorporates a rim portion 205 that functions as a bearing surface for the bearing rollers 218 of the mandrels and serves as part of the structure that maintains the axial relationship of the mandrels. At the point of the gap no support exists and consequently the mandrel is free to fall; the degree of movement being limited by engagement of the mandrel with the member 212. As mentioned, the member 212 has an arm 213 for each mandrel and an opening therethrough affording a clearance passage for mandrels at the portion of reduced diameter indicated by the numeral 210. The annular gap of the clearance passage is such that but a limited angular travel is permitted; the amount being such that at the limit of fall the mandrel end in the vicinity of the left hand supporting structure will be held in a position such that an annular clearance gap is afforded with respect to that supporting structure.

The member 212, which serves to limit the amount of fall of the mandrels at the stripping station, is constructed so that the mandrels are resiliently received when dropped thereon. As shown, the passages formed in the arms of the member 212 are each cored to form a socket or depression 224; each of which bears an angular relationship to the member 212 such that it stands lowermost in the stripping position. In the lower part of each socket are positioned pins 225 which are spaced apart substantially the width of the socket and which extend parallel to the passage axis. These pins are securely held in place and serve as a mounting for a resilient plate 226 of spring steel or the like which is mounted in such a manner that it normally lies flat and with its upper face in a plane above the annular rim 227 of the passage but removed from actual contact with the axially aligned mandrel. When the mandrel is permitted to fall it is yieldingly received by the plate 226 so that objectionable shocks to the machine structures are avoided.

The angular drop of the mandrel is of limited extent and the arrangement of the machine parts is such that no additional structure is required for the operation. As the mandrel approaches the stripping station the roller 218 passes from engagement with its supporting rim 205. As the indexing movement is resumed at the end of the stripping dwell the roller is cammed back onto the rim track 205 which again brings the mandrel into engagement with the other bearings 220 so that the mandrel thus resumes its axial alignment.

Indexing movement of the mandrel assembly incorporates an intermittently operating drive (Figs. 14 and 38) having connection to the common power source. As shown, the continuously rotatable shaft 22 has fixed thereon a bevel gear 230 which meshes with a gear 231 that is fixed to a shaft 232 that extends transversely to the shaft 22 and in a horizontal direction to a point beneath the mandrel assembly. This shaft 232 has fixed thereon a barrel cam 233 which incorporates a guideway 234 that serves to engage and advance lugs 235 having a uniform angular spacing upon a spur gear 236 that is rotatably mounted on a stub shaft 237 fixed to the machine frame. The gear 236 has meshing engagement with the mandrel gear 207 and imparts indexing movement to the mandrel assembly as it is advanced by movement of the barrel cam. The cam 233 rotates continuously and the angular positioning and extent of the cam track 234 is such that the indexing movement is accomplished in timed relation to the movement and travel of the other portions of the machine. As shown, the cam engaging lugs 235 are five in number. The size relationship of the gears 207 and 236 is such that angular travel of the gear 236 by the amount of the spacing of two adjacently related lugs 235 will advance the mandrel assembly the proper indexing travel.

Figure 29:
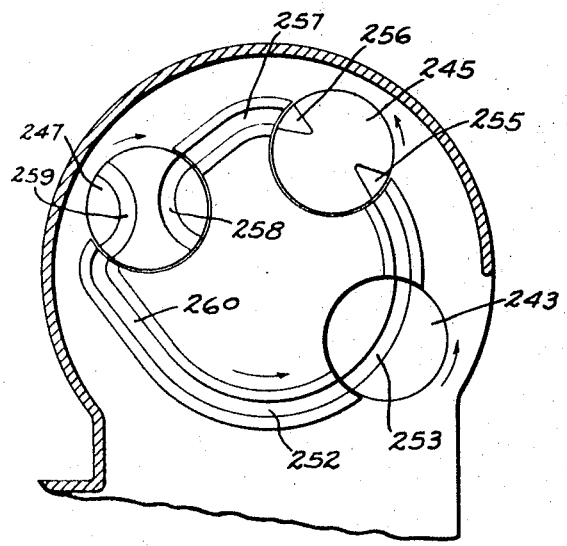
Fig. 29 is a fragmentary sectional view as indicated at 29—29 on Fig. 21 showing in elevation the mandrel driving heads and guiding track.
Figure 30:
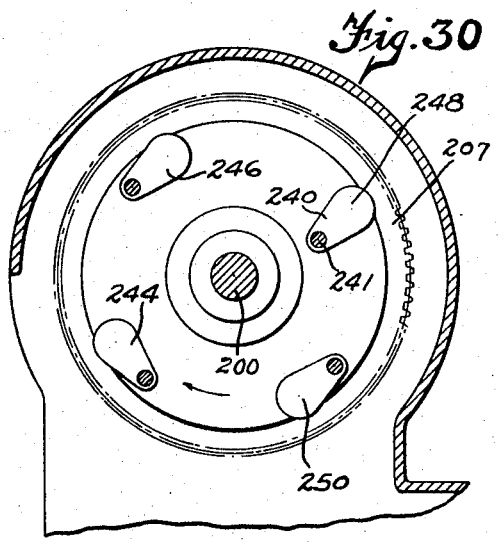
Fig. 30 is a fragmentary sectional view taken on the plane of Fig. 29 but looking oppositely as indicated by the line 30—30 on Fig. 21 and showing the driven ends of the mandrels that engage the parts of Fig. 29.
Figure 32:
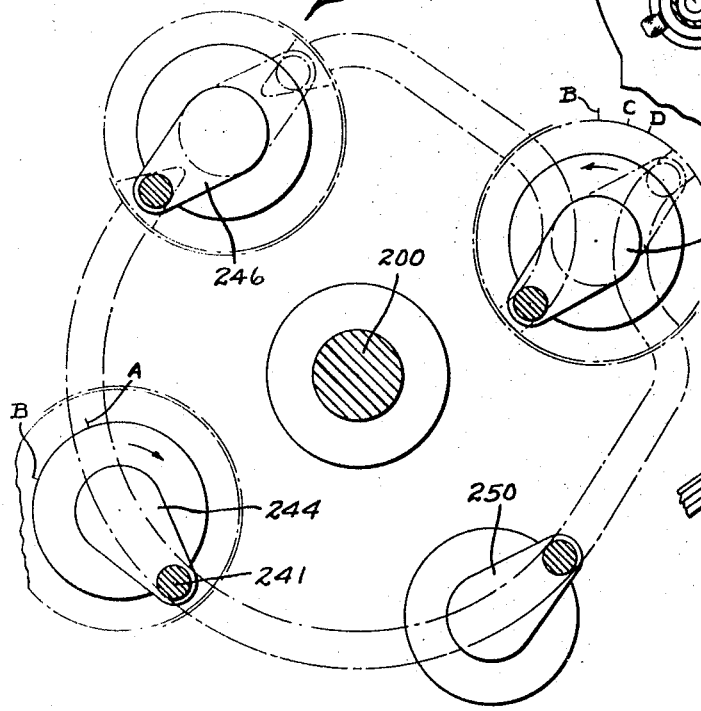
Fig. 32 is a diagrammatic illustration looking in the direction of Fig. 30 with the parts of Fig. 29 superimposed thereon.

Rotational movement of the several mandrels at the different operating stations is derived from the common power source. These mandrel drives operate intermittently and afford a proper mandrel movement at each dwell position. The driving mechanism comprises a crank arm on each mandrel that is adapted to be engaged by a rotatable head at each station where rotation is desired, and to be held within a guiding track during the indexing travel. By provision of such structure continuous control is maintained over the mandrels throughout the operating cycle. This arrangement is clearly illustrated in Figs. 29, 30 and 32, and attention is now directed to those figures. As shown in Fig. 30, the ends of the mandrels that project through the gear 207 have each affixed thereto a crank arm 240 which carries at the outer end a driving lug 241. The driving heads (Fig. 29) with which the crank arm lugs engage at the operating stations comprise rotatably mounted members that are carried by the machine frame structure in positions axially related to the dwell positions of the mandrels. These rotating heads comprise a winding head 243 which is adapted to engage the lug of and rotate the mandrel of the winding station which, in Fig. 30, is indicated by the numeral 244. A winding head 245 is provided at the second dwell position to receive and drive the mandrel occupying that station and which carries the identifying numeral 246. A third driving head designated as 247 is provided at the label applying position to drive the mandrel identified by the numeral 248 and, as no rotation is imparted at the stripping position, there is no driving head there provided; the mandrel of that station, indicated by the numeral 250, being there held within the track or guideway in a stationary position.

The driving heads are provided with lug receiving slots or notches that are positioned to cooperate in the dwell position of the driving heads with the guideway that extends therebetween; the arrangement being such that the mandrel crank arms are always under the influence of one or the other through engagement of the lugs therewith and consequently are always maintained in proper operating relationship. As shown in Fig. 29, the trackway, which is designated generally by the numeral 252, is substantially circular in form and for the major portion of its extent has a radius corresponding to the radial positioning of the mandrels with respect to the shaft 202 upon which they turn. The driving head 243 which stands at the winding station has an arcuate groove 253 therein which in the dwell position stands as a continuation of the guideway or track 252. When stationary at the winding station the mandrel of that position stands so that the drive lug 241 of the crank arm follows or stands behind the mandrel center in the direction of advance of the mandrels which is indicated by arrows in both Figs. 28 and 29. The rotational movement of the winding driving head is four full turns. Consequently at the termination of the winding movement the crank arm occupies the same position as before this movement so that upon being indexed after the winding operation the driving lug 241 continues to be in the trailing position. The mandrel at the second dwell position is aranged to turn two and one-half times and has lug engaging means comprising diametrically spaced notches. The mandrel reaches this station with the lug trailing so that it is received within the driving notch 255. After mandrel rotation at this station of two and one-half turns the driving lug then stands in the position of the notch 256 and is then leading the mandrel or, in other words, it stands in advance of its mandrel. During the following indexing movement the lug traverses the track portion 257 for engagement with the driving head 247 which, as shown, has diametrically opposed arcuate grooves therein. As the mandrel approaches this station the lug enters the curved groove 258 which imparts some rotational movement to the mandrel before head rotation occurs; the proportioning of parts being such that at this station the mandrel comes to rest with its driving lug standing inwardly of the mandrel center as is indicated by the crank arm 248 in Fig. 30. The purpose of this additional indexing is to move the mandrel to a position such that the exterior seam of the wound can body will stand properly related at the label applying station to cause the seam to appear at a desired point of the label. Here also the rotating movement is two and one-half turns so that at the end of the label applying travel the driving lug will stand diametrically opposed to its entering position and the engaged slot will then stand as indicated at 259. In the next indexing travel, wherein the driving lug enters the guide slot portion 260, the lug is caused to again assume a following relationship that is maintained at the stripping position and is continued to the winding station.

Figures 14, 33:
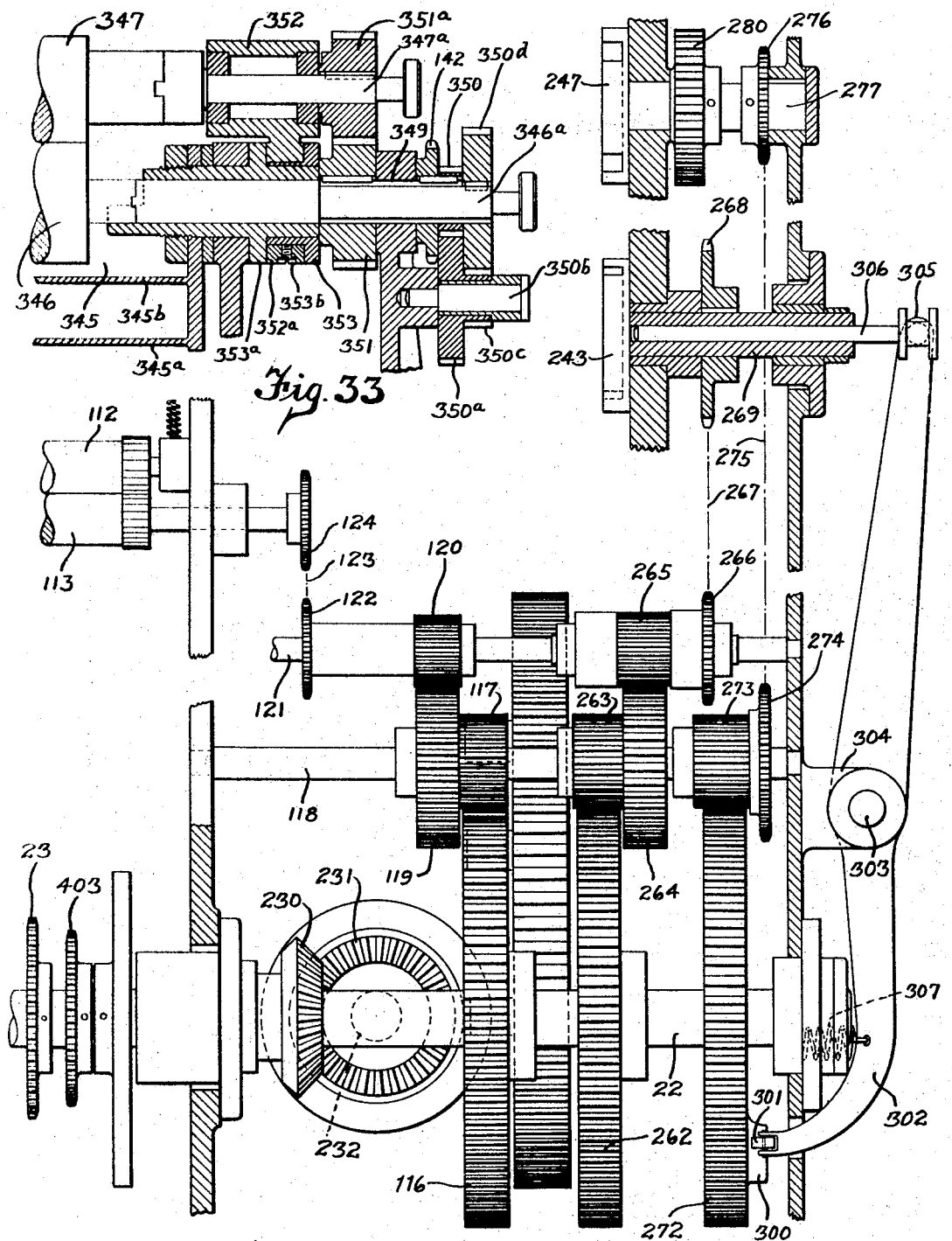
Fig. 14 is a view taken transversely of the machine and illustrates in a diagrammatic manner portions of the driving mechanism.
Fig. 33 is a fragmentary sectional view showing the adhesive applying mechanism.

The several winding heads, which obtain their motion from the common driving source, are driven from gears fixedly mounted on the constantly rotating shaft 22 (Figs. 12 and 14). The drive to the winding head 243 comprises a mutilated gear 262 which meshes with a pinion 263 freely rotatable on the shaft 118 and having fixed thereto a gear 264. The gear pair 262—263 is arranged similarly to the gear pair 116—117 in that a blank tooth area is afforded which limits rotative movement of the driven part to a desired interval in the cycle of operation. The gear 264 meshes with a pinion 265 freely rotatable on the shaft 121 and having fixed thereto a sprocket 266 over which runs a chain 267 that engages a sprocket 268 that is fixed to a sleeve 269 carrying the winding head 243. As shown, the sleeve 269 is suitably guided within axially spaced bearings provided in the frame structure. The winding heads 245 and 247 are intergeared so that they rotate in unison. The drive for these comprises a mutilated gear 272 fixed to the shaft 22 and having meshing engagement with a pinion 273 that is freely rotatable on the shaft 118 and has fixed thereto a sprocket 274. The gear pair 272—273, like the other mutilated gears described above, are arranged to provide driving movement of proper duration at a suitable point in the operating cycle. The sprocket 274 has running thereover a chain 275 which engages a sprocket 276 fixed to the shaft 277 that has mounted thereon the winding head 247 which is the label applying winding head. As shown, the shaft 277 is carried in suitable bearings provided in the frame structure. The shaft 277 has fixed thereto a gear 280 which has meshing engagement with a gear 281 which in turn meshes with a gear 282 that has driving engagement with a gear 283 fixed to the shaft 284 that carries the head 245 of the second dwell position.

Each mandrel incorporates gripping means whereby the advancing paper strips are engaged at the winding station. The paper gripping means (Figs. 22 to 28) comprises a plurality of fingers that are spaced along the mandrel portion 211 and are so positioned that each paper strip is securely held. The gripping means comprises rods 286 that stand transversely of the mandrels. They are spaced according to the paper strip spacing and are associated with an operating mechanism of such character that the rods are caused to move axially and to additionally have some rotative movement. Each rod 286 extends through the mandrel face at a plug 287 and has affixed to the outer end thereof a transversely extending thin metal finger 288 which, as shown in Fig. 27, has a portion 289 terminating some distance from the rod periphery. The portion 289 normally stands in the direction of the approaching paper strips so that they may be received therebeneath.

The control mechanism referred to generally above is such that the fingers 288 may be moved outwardly to a clearance position with respect to the mandrel face in which position the fingers stand as described above. The rods and attached fingers move inwardly with respect to the mandrel to a clamping engagement with the paper strips and, at the proper time in the mandrel cycle, may move angularly to a clearance position with respect to the gripping position, wherein the overlying portion 289 is released from engagement with the paper. The movement of the grippers in each mandrel is controlled by a member 290 which extends axially of the mandrel and has axial travel therein. The member 290 has provided thereon at each gripper position a pair of axially spaced oppositely positioned spring fingers which are adapted to engage the gripper rods as the member is moved axially in accordance with the indexed advance of the mandrel assembly.

Each mandrel enters the winding station with the control member 290 moved to one extreme of travel wherein each spring finger 292 is in engagement with a cross pin 293 on the gripper rods 286 as shown in Fig. 24. This interengagement results in counterclockwise rotation of the gripper finger 288 to the position shown in Figs. 23 and 27 at which position rotative movement is terminated by engagement of a stop pin 295 on the rod 286 with the wall 296 which is one of the walls defining an angular notch 297 in the plug 287. The operating sequence of the gripper parts is such that initial engagement of the spring finger 292 and rod pin 293 swings the gripper finger 288 angularly to the position shown in Fig. 23. Further movement of the member 290 forces the gripper rod 286 outwardly so that the gripping finger 288 is lifted to a clearance position with respect to the mandrel. The positioning of the different gripper parts is such that the resilient finger 292 in engaged position securely holds the gripper in the clearance position by forcing the pin 295 against the face of the plug 287. As mentioned above, the grippers stand in the above described position when the severed paper strips are advanced to the mandrel.

As the advancing edges of the paper strips approach engagement with the grippers the winding mandrel is started to rotate through the driving mechanism described above and, with initial rotation, the gripper controlling member 290 is moved axially to its other extreme of travel (Fig. 25) wherein a second series of spring fingers 298 are brought into engagement with cross pins 299 on each gripper rod. This produces axial travel of the gripper rods which brings the fingers 288 of each into clamping engagement with the paper strips while maintaining the overlying relationship as indicated by the positioning in Fig. 26.

Movement of the control member 290 obtains through the medium of a cam operated device which is actuated from shaft 22. As shown in Fig. 14, the shaft 22 has fixed thereto the gear 272 which carries upon its face a cam 300 which is adapted upon rotation to engage and move the roller 301 of a lever 302 that is pivotally supported at 303 from a bracket 304 mounted on the frame structure. The opposite end of the lever 302 is formed as a yoke 305 which operatively engages the end of a pin 306 that is axially movable within the sleeve 269 and is adapted to be moved upon engagement of the cam 300 with the lever; the operation moving the pin to an extended position beyond the winding head 243 where it engages the end of the gripper member 290 and moves it axially as described above. In the normal dwell position of the winding head the pin 306 stands in retracted position so that it does not interfere with the indexing travel of the mandrel assembly. The cam contour is such that actuating movement of the pin takes place just as mandrel rotation is initiated and consequently gripping movement occurs before the paper strips may be displaced from a proper gripping relationship. The pin is returned to retracted position after the actuating travel by provision of a spring 307 (Fig. 14). The gripper actuating mechanism just described goes through its cycle of movement for each rotation of the winding head. However, the gripper member 290 is moved during the initial turn of the winding head and subsequent actuation exerts no further control.

The gripper control member 290 is maintained in the position described above, which is that illustrated in Fig. 25, until the mandrel begins its advance from the label applying position. During this indexing travel the member 290 is moved from the gripping position of Fig. 25 toward the initial position of Fig. 24; the movement first bringing the member to the intermediate position of Fig. 26 wherein control is removed from the gripper members so that they are free to be turned angularly by withdrawal of the container bodies at the stripping position. This free movement of the gripper fingers obtains when the spring fingers 292 and 298 are both removed from contacting engagement with the cross pins of the gripper rods as shown in Fig. 26. The angular movement of the gripper fingers to the released position takes place with initial withdrawal of the container bodies from the mandrel, and occurs because the adhesively coated layers between which they interfit act to cam them away from interengagement. This movement obtains freely because there is no restraining force acting on the rods 286. The angular movement, however, is limited to substantially a 90° travel by engagement of the stop pin 295 with the notch wall of the plug 287. During the next indexing travel, which advances the mandrel from the stripping station to the winding station, the member 290 is further moved to return it to the position of the winding station as is illustrated in Fig. 23.

Figure 31:
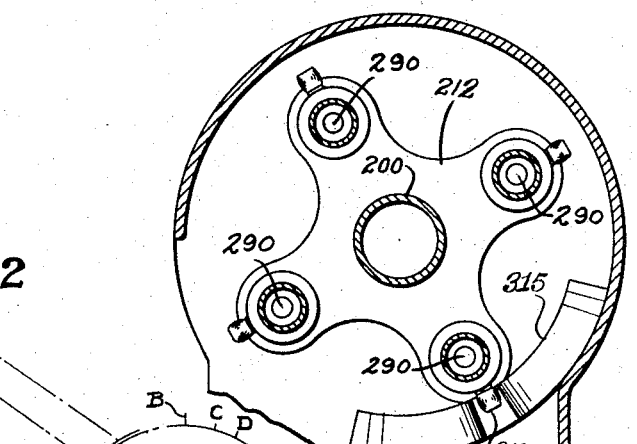
Fig. 31 is a sectional view as indicated by the line 31—31 on Fig. 21.

The return movement of the gripping member 290, which is the travel from the position of Fig. 25 to that of Fig. 24, is obtained from a cam that is fixedly positioned on the machine frame and is arranged to engage laterally projecting rollers that are provided on each mandrel. As shown in Fig. 22, the gripper control member 290, within that portion of the mandrel designated by the numeral 210, carries a cross pin 310 that is of sufficient length to project through diametrically opposed axially positioned slots 311 in the mandrel. The pin 310 is received within and fixed to a sleeve 312 that is adapted to slide axially on the mandrel portion 210 within the limits of the slots 311. Each collar 312 has fixed thereto a roller 313. The roller positioning is clearly shown in Figs. 22 and 31. The operating cam mentioned above comprises a guideway or track 315 that is arcuate with respect to the center of rotation of the mandrel assembly and is inclined with respect to a plane extending transversely of the mandrel axis. As shown in Fig. 22, the cam track 315 is formed as the end portion of a bracket 316 that is fixed to the frame structure; the cam track positioning being such that it extends from a point near the label applying position to a point near the winding station. The lift of the track is such that the gripper control member 290 is moved from the position of Fig. 25 to the position of Fig. 26 while traversing the distance between the label applying station and the stripping station, and is moved from the position of Fig. 26 to the position of Fig. 24 during the indexing travel between the stripping station and the winding station. As no rotational movement of the mandrels occur with respect to the mandrel assembly during this traverse the mandrel rollers 313 are maintained in operating relationship with respect to the cam track.

The mandrels are constructed so that they may be expanded and contracted during traverse of the operating cycle to facilitate removal of the wound container bodies at the stripping station. As shown in Fig. 23, the mandrel winding portion 211 is formed with diametrically opposed axially extending slots or grooves 320 that continue for the full extent of the mandrel portion that receives paper. Plates 321 are fitted within these grooves and are arranged to move radially therein. The plates 321 have an arcuate outer face 322 corresponding to the mandrel contour and an inner face 323 of saw-tooth form. Intermediate each plate 321 and the bottom face 324 of the groove thereof are positioned bars 325 having a smooth flat inner face 326 freely slidable on the groove face 324, and a saw-tooth outside face 327 having a contour corresponding to the inner face 323 of the plates 321 and adapted to interfit therewith. The plates 321, which form a portion of the winding periphery, are held in place through provision of shoulder screws 330 that extend therethrough and are spaced axially along the mandrel. The screws have a head portion 331 that stands within a counterbore 332 formed in the plates 321. Coil springs 333 are provided under each screw head and bear against the plates urging them inwardly to a collapsed position wherein they stand with the outer faces some distance below the mandrel periphery as indicated in Fig. 23.

The bars 325 are movable axially of the mandrel in the grooves within which they are held and, by moving, control expansion or collapse of the plates. The bars are connected with the gripper control member 290 so that plate movement takes place in accordance with movement of the gripper fingers. As shown in Figs. 24 to 26, the control member 290, toward one end of the mandrel, is provided with a cross pin 335 which extends to and has engagement with the ends of the bars 325 as indicated at 336.

At the winding station (Fig. 24) wherein the gripper fingers are extended to receive the paper strips therebeneath the bars 325 stand in a position such that the plates 321 are collapsed as shown in Fig. 23. It is again pointed out that the gripper positioning of Figs. 23 and 24 exists only when no paper is wound on a mandrel. When the grippers move to clamping position, which is upon initial application of paper to a mandrel, and which takes place by movement of the control member 290 to its opposite extreme of travel as shown in Fig. 25, the plates 321 are moved outwardly by axial travel of the bars 325 to the position of maximum expansion wherein they stand at substantially the mandrel periphery. The initial gripper release, which is the position of Fig. 26, produces sufficient collapse of the plates 321 to permit ready withdrawal of the formed container bodies.

As mentioned above, the winding portion of each mandrel is of material length; in the present instance being such that eleven container bodies are simultaneously accommodated in side-by-side relationship. This necessitates a control member 290 of like length. The members are supported for sliding movement at each end of the mandrels as shown and receive some additional support from operating engagement with the gripper parts. Additional guiding means are afforded in the form of diametrically positioned studs 340 which, as shown in Fig. 23, have threaded head portions 341 that are received within the mandrel shell, and have extending ends 342 that bear against the face of the control member 290. The studs 340 are spaced axially of the mandrel as needed.

Having described the mandrel actuating mechanism, attention is now directed to the operations performed on the paper strips at the different indexed positions of the mandrels. As mentioned above, mandrel rotation is initiated at the winding station in timed relationship with the feed of the severed paper strips so that the forward edges of the advancing strips are clamped to the mandrel by actuation of the gripping fingers during the initial mandrel movement. As the winding movement progresses an adhesive is applied to the outer face of the strips; the arrangement being such that the application is initiated on the leading edges of the strips and is maintained until the peripheral surface of the wound tubes is entirely covered.

The application of adhesive obtains through provision of a tank and applying roll structure that stands in the vicinity of the winding station. The roll mechanism rotates continuously but is actuated to adhesive applying position in timed relationship with the other intermittently operated parts. As shown in Fig. 4, the adhesive supply is contained in a tank 345 that extends transversely of the machine for a distance sufficient to accommodate therein a pick up roll 346 of such length that the entire winding extent of the mandrels may be covered. The tank 345, as shown, is arranged as a double walled structure including an outer wall 345a spaced from the inner wall 345b by an amount sufficient to accommodate a quantity of water that may be heated to maintain the adhesive at a proper temperature. As shown, electrical heating coils 345c are provided beneath the outer tank wall 345a.

As mentioned in general terms above, the adhesive applying mechanism is driven from the same driving chain 135 that serves to operate the slitter shaft 130; this drive (Fig. 12) incorporating a sprocket 142 that is keyed to a sleeve 349 (Fig. 33) rotatably mounted on an extended part 346a of the shaft of pickup roll 346. A pinion 350 is keyed on the sleeve 349 in driving engagement with sprocket 142, the pinion meshing with a gear 350a on stub shaft 350b, which also carries pinion 350c meshing with gear 350d mounted in driving relation on shaft 346a. Thus the lower or pickup roll is arranged to be driven at a reduced speed from sprocket 142.

Sleeve 349 also has keyed thereto a gear 351 which meshes with gear 351a on the driving shaft 347a of the transfer roll 347 and provides for driving transfer roll 347 at a greater speed than pickup roll 346. This has been found advantageous in providing a controlled quantity application of adhesive in proper distribution, satisfactory results in spreading a predetermined smooth, uniform surfacing of adhesive on transfer roll 347 having been secured with such roll rotating at a speed approximately seven times that of pickup roll 346.

In order to further provide for control of the quantity of adhesive applied, means are provided for changing the normal spacing between the two rolls. The roll shaft 347a is journaled in a bracket 352 having an extended portion 352a mounted on an eccentric sleeve 353, rotatable on the bearing support 353a for the shaft of roll 346. A set screw 353b normally locks the bracket and the eccentric in fixed relative positioning, providing however for angular rotation of roll 347 and the bracket 352 about the axis of roll 346 without changing the relative spacing therebetween. When it is desired to change the spacing between the rolls, to control the quantity of adhesive transferred, the set screw 353b is loosened and by means of a suitable tool, the sleeve 353 rotated with respect to the bracket 352a.

The transfer roll 347 is arranged to be moved into and out of adhesive transferring relation with the paper strips at a predetermined time in the cycle in order to effect application of the adhesive to the entire web surface but not to the bare mandrel. For this purpose an operating mechanism is provided whereby the transfer roll 347 is caused to swing in timed relation to the winding operation from a clearance position with respect to the winding mandrel to an adhesive applying position wherein it engages the winding paper strips on that mandrel. As shown in Fig. 4, this control comprises a cam 354 that rotates continuously with the shaft 22 to which it is fixed. The cam 354, as shown, is formed to include a depressed portion 355 having an angular extent which defines the interval of adhesive application. The operating connection from the cam to the supporting structure of the roll 347 includes a bell crank 356 pivotally mounted on a stub shaft 357 and including a cam engaging arm 358. The opposite arm of the bell crank is connected by means of a link 359 to an arm 360 that is fixed to a cross shaft 361. The cross shaft has at opposite ends thereof arms 362 connecting with upwardly extending links 363 that connect to arms 364 that are provided on each of the roll supporting brackets 352. Coil springs 266, which are supported at one end upon the machine frame structure, bear against the roll brackets 351 and yieldingly urge the transfer roll 347 toward the applying position. As shown in Fig. 4, the cam positioning is such that the transfer roll is here illustrated in retracted position with the cam close to the point at which the transfer roll may move under influence of the springs 366 into adhesive applying position. This latter movement takes place just as the leading edges of the strips reach the point of adhesive application on the first turn thereof and consequently that portion of the mandrel which does not have paper thereon and which passes the adhesive applying position before the strip leading edges remains free of adhesive so that in the subsequent stripping operation free withdrawal obtains.

A manual control is provided so that the glue transfer roll 347 may be maintained in a retracted position if desired. As shown in Fig. 4, a stop member 367 is pivotally mounted in a stub shaft 368 for rocking movement beneath the cam operated bell crank 356. The stop member 367 has a link connection 367' to an arm 369 that is accessible on the side of the machine (Fig. 1) and is movable to swing the arm 367 beneath the bell crank 356 to hold it in the position that maintains the roll 347 removed with respect to the winding mandrel. The wound tubes comprise three full turns of paper plus an overlap of sufficient extent to avoid a radial relationship of the inner and outer body seams as mentioned. The winding mandrel rotation comprises four full turns. This permits the application of adhesive to be maintained for an interval such that the entire outer surface of the wound strip receives a coating; the transfer roll being withdrawn at the termination of this operation and before the next following mandrel reaches the winding station.

The indexing movement of the mandrels following the winding operation brings the wound tubes under the influence of an ironing member or plate 370 which is shown mounted in brackets 371 that in turn are pivotally supported at 372 from the machine frame. Suitable stop means are incorporated in the mounting so that it may not move so far into the path of indexing travel of the mandrels to strike the tubes of an approaching mandrel in an objectionable manner. The positioning, however, is such that the plate is lifted from its stop position by the mandrel approaching this station so that the weight of the plate 370 will be carried thereby to perform an ironing operation that effectively seals the adjacent adhesively coated layers. In order that an effective sealing or ironing action will be obtained the member is forcibly held in contact by provision of springs 373 that bear against projections 374 on the supporting brackets 371. The member 370 is preferably constructed to incorporate relatively closely spaced ridges 375 which serve to facilitate the even distribution of the adhesive while firmly pressing the outer lap into sealing position. Rotation at this station is in the same direction as at the winding station and comprises two and one-half turns which obtains from a geared interconnection of the driving head of this station with the driving mechanism at the following label applying position. While discussing the operation at the second dwell position of the mandrel advance reference is again made to the bending operation that is performed on the trailing edge of a sheet at the time of sheet separation (Fig. 11). It is again mentioned that bending of the sheet edge, as indicated by the numeral 99, helps materially in obtaining effective sealing of the body outer seam in that this portion of the web is caused to assume a curvature that reduces the tendency toward separation of the outer paper layer and maintains a desired sealing at least until subsequent label applicaiton.

Referring now to the label positioning, and to Figs. 4, 34, 35, and 36, it is there shown that the labels are carried in a supporting structure designated generally by the numeral 380 which comprises a plurality of label bins 381 that extend transversely of the machine and are inclined with respect to the horizontal in a direction such that the ends nearest the label applying mandrel stand uppermost. The positioning of the structure just described and the label movement that takes place there are such that upon operation of the label applying mechanism a proper relationship will obtain between seam and label. Referring now more particularly to Figs. 3 and 37, it is shown that the label bins 381 correspond in positioning to the position of the paper strips on the mandrels and, as arranged, a separate stack of labels is provided for each container body position on the mandrel. The label applying mechanism is such that the labels are received within the bins face upwardly, and withdrawal is accomplished by taking the bottom label of each stack. As a result of this construction the label supply is freely accessible at all times and may be replenished at any time without stopping the machine.

Referring now in greater detail to the label supporting structure, it is pointed out that the bins comprise a bottom member 383 that extends transversely of the machine and has therebeneath a substantial supporting member 384. As shown, the member 383 has a width dimension that is materially less than the length dimension of the labels carried thereon; the arrangement being such that the labels overhang both sides of the supporting member. Within the limits of each bin the member 383 has provided on the upper face thereof thin upstanding bars 386 that extend in the direction of label withdrawal and upon which the labels actually rest. These bars 386 are proportioned as shown in Fig. 37, and are quite thin so that the actual contacting area of the labels with respect to the bottom support is of limited extent. The lateral limits of the bins is defined by separating side walls 387 which are of necessity constructed of thin material because of the very narrow slot formed when separating the sheet into strips by the slitting punches, and because the label width dimension closely corresponds to the height dimension of the container bodies. The upper ends of the bins have relatively narrow cross members 390 that serve to position the labels, while the lower ends of the bins are closed by a member 391 that terminates short of the bin bottom level for admission of mechanism that operates during label application.

Figure 35:
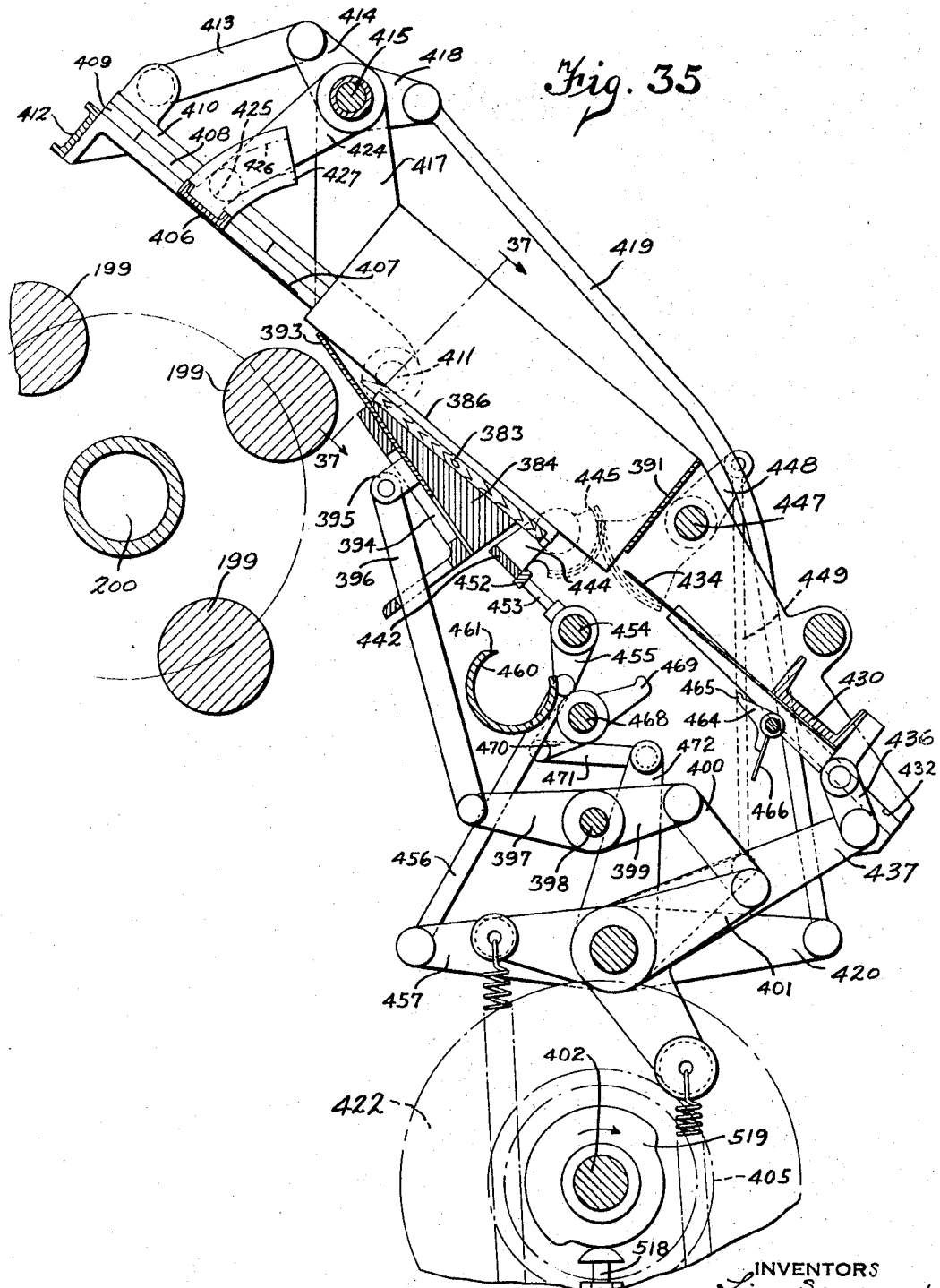
Fig. 35 is a vertical sectional view as indicated generally by the line 35—35 in Fig. 34.

As shown, particularly in Fig. 35, the label bins are arranged so that the labels have a normal positioning wherein they stand removed with respect to the label applying mandrel, but with the upper ends thereof so placed that they may be moved into engagement without bodily moving the label stacks. Label application obtains by separating from the main body of each label stack a small quantity of labels at the bottom of each bin and by bending down the upper end of the small quantity of labels so that the lowermost is brought into contact with the adhesively coated tubes on the adjacent mandrel at a proper time in the operating cycle. Label separation is effected by movable blade structures incorporating flexible blade members that enter the label stacks from opposite ends thereof. That part which enters the upper ends of the stacks serves additionally to move the labels into engagement with the mandrel. That part which enters the lower ends of the stacks serves additionally to insure withdrawal of but a single label from each stack.

To briefly outline the label applying cycle before describing the structure in detail it is pointed out that the operation comprises in sequence, the separation of the lowermost end of the bottom label in each stack, the entrance of the lower blade structure to separate the stack and grip those labels therebeneath except the lowermost, the entrance of the upper blade structure followed by an angular movement of that structure to bend the labels therebeneath sufficiently to bring the end of the lowermost label of each bin into contact with the adhesively coated tubes on the adjacent mandrel, and rotation of the mandrel to withdraw the labels from the bins by adhesion of the ends that occurs upon bending the stack.

That portion of the label stack which overhangs the bottom supporting structure at the upper end thereof is supported during the interval of positioning as shown in Fig. 35 through provision of a sliding plate that moves in a plane angularly related to the bottom support and is withdrawable from the extended position at a proper time in the operating cycle to permit the upper end of each label stack to be bent downwardly. As shown particularly in Figs. 35 and 36, the movable supporting structure described immediately above comprises a plate 393 that is slidable within guideways 394 attached to the underside of the transverse supporting member 384. The slidable member 393 has lugs 395 thereon connected to links 396 having connection to arms 397 fixed to a shaft 398 having an arm 399 thereon that connects by means of a link 400 to a bell crank 401 that is moved through its cycle by an engaged cam on a transverse shaft 402 that is rotated continuously by an operating connection with the continuously rotating shaft 22. As shown, the shaft 22 has fixed thereon a sprocket 403 over which runs a chain 404 having driving engagement with a sprocket 405 on the shaft 402 which contains numerous cams that serve to actuate the various parts of the label applying mechanism. In Fig. 35 the plate 393 is shown in the extended position which is maintained during the indexing interval of the mandrel assembly. At the conclusion of the indexing travel the label applying mechanism is put into motion which causes separation of the stacks as described generally above and causes withdrawal of the plate 393 to the position of Fig. 36. The blade structure that acts on the upper ends of the label stacks comprises a transverse member 406 to which are attached blades 407 that are spaced in accordance with the bin spacing. Transverse member 406 has at the opposite ends thereof guide blocks 408 that are slidably received within the guideways 409 of brackets 410 positioned at each side of the machine and pivotally mounted on the frame structure at 411. The brackets 410 are interconnected by a cross brace 412. Operating mechanism connected to the brackets serves to swing the brackets 410 to produce a reciprocating and angular movement in the blades 407. As shown, the brackets 410 have connected thereto links 413 connecting to arms 414 that are fixed to a rock shaft 415 supported on uprights 417 from the machine frame. One end of the rock shaft 415 has fixed thereto an arm 418 from which extends a link 419 that connects to one end of a bell crank 420 that is caused to move through its cycle by engagement with a cam that is fixed to the shaft 402 and is rotatable therewith. The rock shaft 415 also has fixed thereto spaced arms 424 terminating at their outer ends in rollers 425 that are received within arcuate channels 426 formed in arms 427 that are positioned on the knife supporting cross member 406 adjacent the ends thereof. Movement of the arms 424 controls reciprocatory travel of the blades while movement of the arms 414 controls angular travel thereof. The movements occur simultaneously because of the common driving connection.

As the label stacks are held to prevent withdrawal of other than the lowermost label of each stack it is desired that the lower blade structure complete its entering movement before the upper blade structure completes its travel to the applying position. As shown, the blade knife structure comprises a transverse blade supporting member 430 which has guide members 431 at the opposite ends thereof that are slidable within guideways 432 formed in the frame supporting structure. The guideways 432 stand inclined somewhat with respect to the plane of the label stack so that the travel of the lower blades 434 is slightly upward with respect to the plane of the label stack during the interengaging travel. Although the guideways 432 which define the path of travel of the blades 434 are inclined with respect to the plane of the label stack the blades 434 stand parallel with respect to the label stack and, as a result of this relationship, provide a limited lifting movement of that portion of each label stack above the blade during entrance of the blades. This results in the provision of a clearance gap between the main body of the labels and the relatively small quantity of labels beneath the blades 434 so that this small quantity is relieved of the weight of the entire stack to thus facilitate removal of the lowermost label. As is shown in Fig. 36, stack separation effected by the lower blade stops short of stack separation by the upper blade so that the divided small quantity of labels is not entirely separated from the major portion and as a result the lower portion of the label stack is held against unintentional displacement. Further the blade arrangement is preferably such that the upper and lower blades enter the label stacks at slightly different elevations, with the upper blades above the lower blades.

The operating structure for the lower blades comprises links 436 that connect the label guides 431 to a rockable arm assembly including the arm 437 that is engaged by and is actuated by a cam fixed to the driving shaft 402.

The labels are formed of such length that they completely encircle the container body and have in addition a small overlap of the order of three-eighths of an inch. The adhesive coating on the exterior of the container bodies serves to hold the first wrap of a label. The part comprising the overlap separately receives adhesive as part of the label applying operation. This is accomplished in such a manner that the operation functions additionally to insure withdrawal of only the lowermost label in a stack.

The overlap adhesive applying mechanism comprises a rockable member 442 that extends transversely of the machine and, at each label bin, is provided with an adhesive receiving pad 443. The member 442 is supported at the opposite sides of the machine on arms 444 that are pivotally mounted on the frame structure and which incorporate as an integral part thereof a gear sector 445. The gear sectors 445 mesh with gear sectors 446 that are fixed to a rock shaft 447 which has, at one end thereof, an arm 448 connecting to a link 449 that is joined to a bell crank 450 having an end portion that rides against and is operated by a cam fixed to the shaft 402. The cam contour is such that the adhesive pads 443 are movable from a retracted position as shown in Fig. 35 to a position in which they engage the lower end of the lowermost labels. Further movement promptly follows that carries the pads, with labels adhering thereto, to the position of Fig. 36 which brings the lower end of the lowermost label of each stack to a clearance position with respect to the stacks to permit the engagement of the label stacks by mechanism that functions to prevent withdrawal thereof. The complete cycle of movement of the pad 443 includes further travel from the position of Fig. 36 to the position of Fig. 35 wherein the supply of adhesive thereon is replenished through provision of a movable supply pad.

The supply pad, or series of pads of which one is provided for each label position, comprise a member 452 of a length corresponding to the extent of the glue receiving faces 443. The member 452 is supported as indicated at 453 from a rock shaft 454 that extends transversely of the machine and which has thereon an arm 455 connecting through a link 456 to an arm 457 that is actuated by a cam on the shaft 402. Adhesive for the pads 443 is carried in a tank 460 that extends transversely of the machine and is illustrated as being formed of cylindrical cross section having an open top which is proportioned to receive the supply pads 452 when in the retracted position as shown in Fig. 36. The amount of adhesive picked up by the transfer pads is regulated by arranging the tank with respect to the pads so that a scraping action takes place between the pads and the tank edge during passage of the pads from the tank. As shown, one side of the tank 460 terminates in an edge 461 that is positioned to remove excess adhesive from the pads during the travel toward engagement with the retracted pads 443 as shown in Fig. 35.

The actuation of the overlap adhesive applying mechanism takes place at a point in the cycle of operation of the machine such that the pads 443 reach the position of Fig. 36, with the lowermost labels adhering thereto prior to the termination of the entrance movement of the lower blades 434. The blade structure carries holding means that engage the lower end of the stacks beneath the blades at the end of this travel. As shown, the holding means comprises a rockable member 464 pivotally mounted from the blade supporting structure 430 at each label stack. The positioning of the members 464 on the supporting structure is such that in engaged position of the blades 434 the gripping finger 465 of each member will lie beneath its stack in such a positioning to grip these labels upon pivotal movement. In retracted position of the blades the fingers assume a spacing with respect to the blades 434 which is such as to permit travel of the fingers into engaging position sufficiently below the label stacks to insure clamping action upon all of the labels below the blade. The clamping action obtains by virtue of a resilient finger 466 on each gripper which is engaged by an operating mechanism when in the position of Fig. 36. As shown, the operating mechanism comprises a rock shaft 468 having fixed thereon arms 469 which are spaced to coact with the resilient fingers 466 of the gripping members 464. The rock shaft 468 has fixed thereto an arm 470 connecting through a link 471 with an arm 472 that is part of a bell crank that is actuated by a cam on the shaft 402. In the retracted position of the lower knife structure the arms 469 are turned so that they stand out of the path of travel of the gripper members in order that the portions 466 may pass thereover without interference. When the knife structure moves to engaged position the shaft 468 is rocked counterclockwise to the position shown in Fig. 36 wherein the arms 469 engage the fingers 466 and move the fingers into engagement with the label stack beneath the knife 434. As mentioned above, this last described movement takes place after the adhesive pads 443 have withdrawn the lowermost label.

After all of the above described movements have taken place the upper blade structure completes its angular travel which brings the upper end of each lowermost label into engagement with the container bodies on the adjacent mandrel. Initial adhesion of the label to the body face is sufficient to withdraw the labels from the stacks upon mandrel rotation. During winding of the labels a smoothing effect is obtained from those labels beneath the upper blades which are held in contact during mandrel rotation. The force necessary to start withdrawal of the labels from the stacks is not great and as a result a desired registration of body seam and label is maintained without difficulty. During this operation the major portion of each label stack is supported by the interengaged blades, and the small quantities of labels beneath the blades are carried upon the spaced narrow rails from which they may easily slide. As mentioned in general terms above, and as shown in Figs. 4 and 36, the blades that separate and support the labels are flexible. These blades are preferably of a thickness of the order of a heavy clock spring and consequently may be readily deformed. As shown, the upper blade depresses the label stack in a manner that presents the lowermost label properly for attachment to the container body. The lower blade, when separating the stack, does so while avoiding abrupt bending of the stack. The overlap ends of the labels are readily disengaged from the adhesive coated pads to which they adhere at initiation of the label wrapping. This adhesive coated portion is drawn across the stack supporting rails but, because of the limited contact area afforded by these narrow rails, label withdrawal is not adversely affected.

Figure 47:
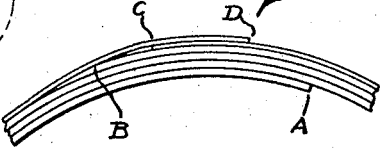
Fig. 47 is a fragmentary diagrammatic view illustrating the container body seam and label overlap relationship.
Figure 34:
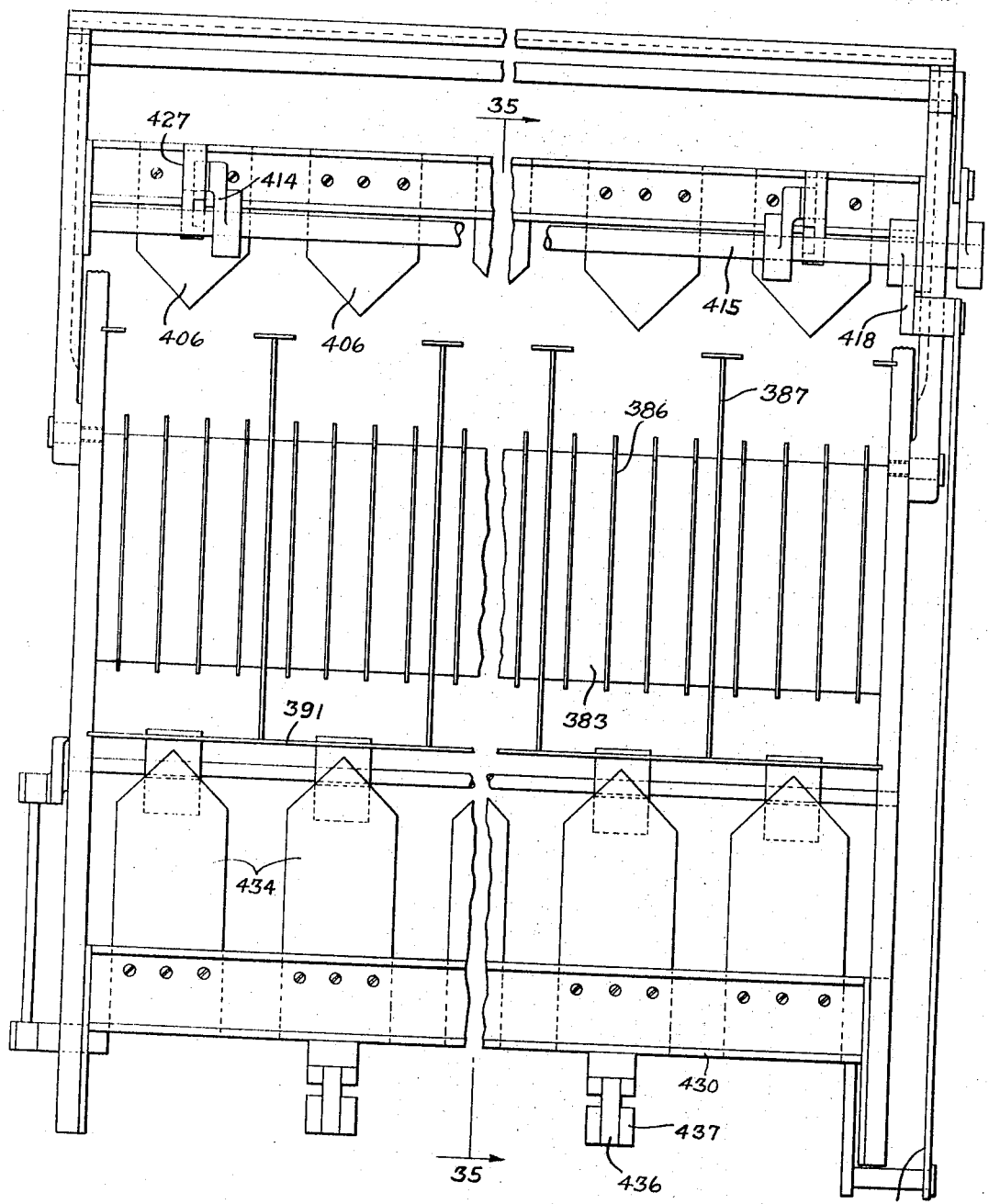
Fig. 34 is an enlarged fragmentary plan view of the label bins and associated feeding parts.

It has been brought out that the indexed position of a mandrel at the label applying station is coordinated to the operation of the label applying mechanism. This relationship is such that an assembly will be effected in which the container seam is properly positioned with respect to the reading matter of the label, and in which the label will be so placed to securely hold the last wrap of the container body against separation adjacent the outer seam. Referring now to the adjacently related diagrammatic Figs. 32 and 47 in describing the label relationship, the point indicated by A on the winding mandrel 244 of Fig. 32 defines the angular positioning of the leading edge of the paper strips with respect to the mandrel driving lug 241. As the direction of winding is clockwise as indicated by the arrow, and as the body strip is of such length to include an overlap, the outer seam, which is the trailing edge of the paper strips, will be to the left of A as indicated at B. When the mandrel advances to the label applying station 248 the outer seam B then stands so that the end of the label that is first applied to the container body will engage at C. Here the direction of mandrel rotation is counterclockwise and, as the label is of such length to incorporate an overlap, the outer seam of the label will stand as at D. Attention is directed to the fact that the container body end B (Fig. 47) is sufficiently remote with respect to the label end to afford sufficient gripping area to enable the label to effectively hold the body end from separating in the interval before the adhesive sets. The label reading matter is arranged thereon so that it does not occur within the vicinity of the seam B.

The mandrel with the applied labels now advances to the stripping position wherein the container bodies are removed. It is at this station that the mandrel is released from supporting engagement at the left hand end thereof to permit withdrawal of the container bodies by traverse of a stripping mechanism that is provided on a machine structure and is movable beneath the stripping station of the mandrel assembly. As shown in Figs. 4, 21, 38, and 39, the mandrel stripping device is arranged as a conveyor comprising horizontally extending laterally spaced parallel chains 476 that run over sprockets so positioned that the upper reach of the chains is parallel to the mandrel axis. One sprocket indicated by the numeral 477 stands at the right-hand side of the machine and is carried on a shaft 478 including a sprocket 479 over which runs a driving chain 480 which traverses a sprocket 481 on the shaft 232 that carries the barrel cam 233 that indexes the mandrel assembly. The opposite end of the chains run over a sprocket 483 rotatable on a shaft 484 carried by arms 485 which extend from parallel bars 486 that are positioned to provide an underlying support for the upper reach of the conveyor chain. The conveyor is of sufficient length to strip the full length of a mandrel and to deliver the container bodies therefrom to a desired point removed from the mandrel.

The conveyor structure incorporates stripping members 488 that are two in number and are spaced at opposite points on the run of the conveyor chain. The proportioning of the conveyor parts is such that the conveyor may be operated continuously from the constantly moving shaft 232, and is such that a stripping member 488 is brought into stripping position just after a mandrel is delivered thereto. The traverse of a stripping member with respect to a mandrel is completed prior to the next succeeding indexing movement, and the movement of the conveyor during the indexing travel is such that the next succeeding stripping member is brought into operating position to perform its stripping operation as the next following mandrel comes to rest in the stripping position. The stripping members, designated generally by the numeral 488, comprise a flat plate 490 having attachment to each of the chains 476 and having mounted thereon an arcuate member 491 of which the inner radius is such as to closely engage the mandrel face during the stripping movement. The positioning of the member 491 on its supporting plate 490, and the contour of this part is such that the stripping members will pass readily through the gap 223 provided in the supporting ring 204 of the mandrel structure and to likewise pass through the notches 219 provided in the mandrel assembly end member 202.

During withdrawal of the container bodies from the mandrel at the stripping station a sealing substance is applied to the inner seam of the containers to provide an effective seal at this portion of the container structure so that wicking or seepage of the container contents into the container side wall is effectively prevented. In the illustrated embodiment of the invention the sealing substance is applied from a tank carried at each mandrel end and provided with an air jet which, by an aspirating action, withdraws the fluid from the tank and directs it against the container inner wall as a spray. The substance is a greaseproofing material of such character that it will unite homogeneously with the surface coating, and it preferably comprises a solution of the same or similar cellulose ester material. The apparatus described above in general terms is illustrated on Figs. 43 to 46. As there shown, each mandrel has affixed to its left-hand end a tank 495 of which the periphery is generally cylindrical and has thereon relatively shallow axially extending flutes 496 of which the outside diameter corresponds to that of the winding portion 215 of each mandrel. The tank is attached to the mandrel by having at one end thereof an axial projection 498 which is telescopically received within the end sleeve 216 of each mandrel; the attachment being such that the tanks are securely held in axial relationship while spaced from the mandrel shells sufficiently to afford free turning movement of the rollers 218.

The tanks, which have a suitable filling opening therein, terminate at their outer ends in a threaded sleeve-like extension 500 which is externally threaded at 501 and which, as shown, has a diameter somewhat less than that of the tank proper. At the tank end adjacent the junction of the sleeve 500 is provided an inturned annular flange 502 which functions as a seat for a tank closure member 503 which incorporates the spraying mechanism. The member 503 comprises a central body part 504 that is formed integrally with a web-like part 505 that terminates in an annular flange 506 that is slidably receivable within the sleeve 500 and which is adapted to bear against a sealing gasket 507 on the face of the flange 502.

The member 503 is held in place by a collar 510 which is internally threaded as indicated at 511 to take the threads of the sleeve 500 and which also incorporates an inturned flange 512 that is adapted to bear against the web portion 505 to thus force the member 503 into sealing engagement with the gasket. The axial extent of the peripheral flange 510 is such that it extends to substantially the shoulder at the junction of the sleeve 500 with the main tank portion and extends oppositely a distance sufficient to support the containers during their passage past the spraying position. It is here pointed out that the construction just described is such that the member 503 may be assembled to the tank with the nozzle structure pointing in any desired position. It is further pointed out that the flange part 510 has a gap 513 therein affording a clearance opening for the spray to act against the container inner faces during their ejection from the mandrel.

Fluid is withdrawn from the tank by means of a tube 514 that extends from within the tank through a boss 515 in the member 503; the exterior portion of the tube terminating as indicated in proper operating relationship with an air jet 516. That portion of the fluid supply tube 514 within the tank is formed with a goose-neck as indicated at 517 in Fig. 43, and is so arranged that fluid flow therethrough will be prevented except at the desired operating interval.

Air flow to the jet 516 is from some suitable external supply source. The interval of air flow is in timed relation to the operating sequence of the machine and is controlled by means of a valve 518 in the supply line that is supported on the machine frame and is actuated by a cam 519 that is carried by the continuously rotating shaft 402 (Fig. 4). The air valve utilized is of that type commonly known as a whistle-valve and incorporates a spring pressed valve plunger which normally holds the valve in closed position; the valve being mounted on the machine structure so that the plunger is engaged by the cam to permit air flow during the withdrawal of the container bodies at the stripping station.

The arrangement of the spraying device is such that an air connection is made to each mandrel as it reaches the stripping station and this, as shown, comprises an air conveying fitting that is mounted on the machine frame structure and is positioned to engage a fitting on each mandrel; the latter fitting having an air connection to the jet of that mandrel. Referring now in greater detail to the apparatus described immediately above, the air line from the whistle valve comprises a pipe 522 which terminates in a fitting 523 that incorporates a bracket 524 that is bolted to the frame structure. The part 523 is of sleeve-like form and receives the pipe 522 in threaded engagement therewith. Axially slidable within the part 523 is a stem 525 that is formed with an annular groove 526 that is adapted to register with the supply pipe 522. One end of the stem 525 continues beyond the part 523, as indicated at 527, and terminates in a disk-like part 528. A coil spring 529 is provided between the disk 528 and the part 523 to urge the stem axially; this axial movement being limited by lock nuts 530 that are threadedly received on the opposite end of the stem 525.

Each mandrel, at the end adjacent the indexing mechanism, has fixed thereto a fitting 532 which is adapted to register with the part 528 when a mandrel reaches the stripping station. As shown in Fig. 43, the fitting 532 is arranged so that its outside end portion stands on a radial line with respect to the center of rotation of the mandrel assembly which is indicated on that figure by the numeral 200'. The fitting 532 terminates in a transverse face 534 of such composition that it will cooperate with the part 528 to provide an air-tight joint therebetween. As shown, the lock nuts 530 on the stem are positioned so that the maximum outward travel of the stem carries it within the path traversed by the end of the fitting 532. The cooperating parts 528 and 532 are beveled at their peripheral portions so that a camming action obtains upon engagement of the parts as each mandrel reaches the stripping position. The overlapping relationship results in movement of the stem from its stop position an amount sufficient to enable the spring to act to hold the parts in tensioned engagement.

The fitting 532 has a passage therethrough as indicated at 535 which opens into a tube 536 that extends through the mandrel portion 211 and terminates within the mandrel portion 215 in a fitting 537 opening into a radial passage 538 that terminates in an axial passage 539 formed in the extending end 498 of the tank. The passage 539 connects with a pipe section 540 extending through the tank and terminating at its opposite end in close fitting engagement with an axial boss 541 on the tank end part 503. The boss 504 has a passage therein communicating with a radial passage 542 that is internally threaded to receive the threaded jet member 516 which incorporates a lock nut 543 whereby a desired positioning of the jet member may be maintained. As shown, the jet member stands perpendicularly related to the end of the supply tube so that a blast of air thereacross will provide the desired aspirating action on the supply tube.

The operating cycle of the inner seam spraying device is so timed with respect to the associated operations that air is supplied to the spray jet as the stripping operation is initiated, and is maintained during the interval that the container bodies pass the spray position while being withdrawn from the mandrel.

As shown in Fig. 21, the stripping conveyor extends for some distance beyond the terminal ends of the mandrels. The spacing of the conveyor chain supporting sprockets is such that a chain may be utilized of sufficient length to accommodate two strippers at opposite points on the run of the chain, and is such that continuous conveyor travel may be maintained to thus avoid the necessity for an intermittently operating drive. In other words, one of the strippers traverses the mandrel of the stripping station during each dwell interval and, during the travel that obtains within the following indexing interval, the other stripper is advanced to a position to strip the succeeding mandrel upon the next following dwell.

The operating cycle is so proportioned that the dwell interval of the mandrel assembly consumes two-thirds of the complete cycle and indexing is accomplished in the remaining one-third. The traverse of a stripper during removal of the container bodies is therefore approximately two-thirds of the upper reach or length of the conveyor. The container bodies leaving the stripping conveyor may be disposed of as desired. It will be understood that the term "container" is used herein as referring to the tubular bodies produced in accordance with this invention and of circular, rectangular, or other cross sectional form and adapted for subsequent reception of one or both end closure members, as desired.

While the method herein described, and the form of apparatus for carrying this method into effect, constitute preferred embodiments of the invention, it is to be understood that the invention is not limited to this precise method and form of apparatus, and that changes may be made in either without departing from the scope of the invention which is defined in the appended claims.

What is claimed is:

1. A machine of the character described adapted to form container bodies and the like from a web of paper material which comprises means for intermittently feeding said web, means for shearing said paper into lengths during periods of stoppage of said feed means, and means cooperating with said shearing means and operative while said paper is maintained stationary for bending the trailing edge of the severed length in such manner as to facilitate its close application to the body of the formed container.

2. A machine of the character described adapted to form container bodies and the like from a paper web which comprises means for feeding the paper web, a mandrel for receiving said paper web and winding the same into container form, means for effecting application of adhesive to the leading edge of the web as it is wound on the mandrel, and means operated in coordinated timed relation with the rotation of the mandrel to effect termination of adhesive application following application to the outer surface of the outer lap of the formed container to thereby provide adhesive on said outer surface for the purpose of receiving a label thereon.

3. A machine of the character described adapted for the formation of container bodies and the like which comprises a mandrel assembly including a plurality of rotatable mandrels, means for successively moving said mandrels through a winding station, an ironing station, and a label applying station, means at said winding station for feeding a paper web to said mandrels for winding thereon into container form, means at said ironing station for subjecting the container to a pressure ironing application, means at said label applying station for applying a label to the surface of the container, means for effecting a predetermined rotation of the mandrels in certain of said stations, and means for maintaining definite control over the angular positioning of each of the mandrels throughout said series of stations.

4. A machine of the character described adapted for the formation of container bodies and the like from a web of paper which comprises means for feeding the paper web, a mandrel assembly having a winding station and a label applying station, rotatable mandrel means at said winding station for receiving the paper web, means coordinated with the rotation of said mandrel means for applying adhesive to the web while on the mandrel, means for winding said web into container form with said adhesive on the side of the web away from the mandrel to adhesively secure the container in wound form and provide adhesive on the exterior surface thereof, means for moving said container from said winding station to said label applying station, and means for applying and adhesively securing a label to said formed container through utilization of the adhesive previously applied.

5. A machine of the character described adapted for the formation of container bodies and the like from a web of paper which comprises a mandrel assembly having a plurality of stations, means for receiving and winding a web of paper at one station into the form of convolute container bodies having an outer seam, means for applying adhesive to the web during the winding operation to provide a formed container body having an external adhesive application, means for successively moving said formed body through the remainder of said operative stations, means for creating an ironing pressure on said formed container body at a second station, and means at a third station for applying a label in predetermined positioning with respect to said container body and to said seam, said label being adhesively secured by utilizing the adhesive applied at said first station for adhesively securing the label thereto.

6. A machine of the character described adapted for the formation of container bodies and the like from a web of paper which comprises means for winding the web of paper into container form, and means for applying a label thereto from a stack of labels including means movable into said stack for bending a relatively small group of labels into contact with the container body, means for retaining the remainder of the labels in said stack during the bending of said group of labels and during subsequent withdrawal of the lowermost label, and means for rotating said container body to effect immediate withdrawal of the lowermost label from said stack and the winding thereof in predetermined desired position upon the body of the container.

7. A machine of the character described adapted for the formation of container bodies and the like from a plurality of strips of paper which comprises a mandrel assembly including a plurality of rotatable mandrels, means for successively moving said mandrels through a plurality of operative stations, means at one of said stations for simultaneously feeding the paper strips to said mandrels for winding thereon into the form of convolute container bodies having outer seams, means for applying an outer adhesive surfacing to said formed containers, and means at another of said stations for applying a label to the formed containers in predetermined positioning with respect to said outer seams from a plurality of stacks of labels including means for pressing a group of labels into contact with a predetermined portion of the adhesive coated surface of each container, and means for rotating said containers to effect withdrawal of the lowermost labels and application thereof to the surface of each of the containers while maintaining said predetermined positioning of the labels with respect to said outer seams.

8. A machine of the character described adapted for the formation of container bodies and the like from a web of paper which comprises means for winding the paper web into container form, means for applying an outer adhesive sufacing to said formed container, and means for applying a label to the formed container from a stack of labels including means for engaging the lowermost label in the stack with the adhesive coated surface of the container, means for effecting a separation between an end of the lowermost label and the remaining labels in said stack, means for rotating said container to effect withdrawal of the lowermost label, and means movable into said separation between the lowermost label and the remaining labels for engaging the labels above said lowermost label for retaining said remaining labels in the stack.

9. A machine of the character described adapted for the formation of container bodies and the like from a web of paper which comprises means for winding the paper web into container form, means for applying an outer adhesive surfacing to said formed container, and means for applying a label to the formed container from a stack of labels including means for effecting application of the lowermost label to the adhesive coated surface of the container, means movable into the stack of labels above said lowermost label for supporting and retaining the remaining labels in the stack, and means for rotating the container to effect withdrawal and winding of the lowermost label in predetermined positioning upon the container.

10. A machine of the character described adapted for the formation of container bodies and the like from a web of paper which comprises means for winding the paper web into container form, means for applying adhesive to said paper web to secure the container in wound form and provide an outer adhesive surfacing to said formed container, and means for applying an overlap label to the formed container from a stack of labels including means for withdrawing the lowermost label in the stack, and means for effecting an adhesive application to the small overlapped area of label to provide for adhesively securing the overlapped end thereof.

11. A machine of the character described adapted for the formation of container bodies and the like from a web of paper which comprises means for winding the paper web into container form, means for applying adhesive to said paper web to secure the container in wound form and provide an outer adhesive surfacing to said formed container, and means for applying an overlapping label to the formed container from a stack of labels including means for lifting the labels in said stack to relieve the weight on the lower group of labels, means for applying a narrow strip of adhesive to one end of the lowermost label, means for moving the other end of said label into contact with the adhesive coated surface of the container, and means for rotating said container to effect withdrawal of said lowermost label from the stack, said adhesive coated portion serving to retain the overlapped end of the label in proper position on the container.

12. A machine of the character described adapted for the formation of container bodies and the like from a web of paper, which comprises a winding mandrel assembly, means for successively moving said assembly through a plurality of operative stations, means including a mandrel for receiving said paper web and winding the same into convolute container form having inner and outer seams at one of said stations, means at a second of said stations for effecting a pressure application to the wound container to secure an ironing action thereon, means for effecting the application of a label to the container at a third station, means operative at a fourth station for effecting stripping of said formed container from said mandrel, and means operative at each of said stations to maintain predetermined controlled positioning of said mandrel and said containers.

13. A machine of the character described adapted for the formation of container bodies and the like which comprises a stationary supporting frame, means for feeding a paper web, and a winding means for winding the paper web into container form including a mandrel assembly frame rotatably mounted in said supporting frame, a plurality of winding mandrels rotatably mounted in said mandrel assembly frame, means for effecting rotation of said mandrel assembly frame to bring said mandrels successively into a series of different operating positions, means at certain of said operating positions for effecting selective rotation of the indivdual mandrel thereat on its own axis, and means cooperating with said stationary supporting frame and said mandrels for maintaining continuous control over the angular positioning of each of said mandrels throughout movement of said mandrel assembly frame and at said operating positions and providing for the selective rotation of the mandrels at said certain positions and for non-rotation of the mandrels at another of said operating positions.

14. A machine of the character described adapted for the formation of container bodies and the like from a web of paper which comprises means for feeding a paper web, and winding means therefor including a mandrel assembly frame, a plurality of separate mandrels rotatably mounted in said frame, means for moving said frame to successively bring each of said mandrels into a plurality of operative positions including winding, label applying, and stripping positions, means for imparting a predetermined rotation to each mandrel when in certain of said positions, and means for maintaining continuous control over the angular positioning of each of said mandrels throughout movement of said frame and at said operative positions, said control means providing for effecting predetermined angular movement of each of the mandrels about its own axis as the mandrel is moved between certain of said operative positions and providing for maintaining the mandrel stationary at said stripping position.

15. A machine of the character described adapted for the formation of container bodies and the like from a web of paper which comprises means for feeding a paper web and winding means therefor including a mandrel assembly frame, a plurality of mandrels rotatably mounted in said frame, means for rotating said frame to move said mandrels through a successive series of operating positions, means operative in certain of said positions to impart a predetermined rotation to said mandrels, and means operative in response to movement of said frame for freeing one end of the mandrel in one of said positions to provide for stripping of the formed container therefrom.

16. A machine of the character described adapted for the formation of container bodies and the like from a web of paper which comprises means for feeding a paper web and winding means therefor including a frame for said machine, a mandrel assembly rotatably mounted in said frame, a plurality of mandrels rotatably mounted in said mandrel assembly, means for rotating said mandrel assembly to move said mandrels through a series of successive operating positions, means on said mandrels cooperating with a guide means on said frame for maintaining continuous control over the mandrels with respect to said frame to provide for establishing a predetermined angular positioning of the said mandrels in each of said successive operating positions, and means operative in certain of said mandrel positions for effecting rotation thereof with respect to said mandrel frame.

17. A machine of the character described adapted for the formation of container bodies and the like from a web of paper which comprises means for feeding a plurality of strips of paper from a paper web and winding means therefor including a mandrel assembly frame, a plurality of mandrels rotatably mounted in said frame, means for moving said mandrels successively through a winding, label applying, and stripping station, guide means on said mandrels cooperating with a guide means on said frame for maintaining continuous control over the mandrels with respect to said frame to provide for establishing a predetermined angular positioning of said mandrels in each of said successive operating positions, rotatable means at said winding and label-applying stations for receiving said guide means on the mandrels and effecting predetermined rotation of the mandrel thereat on its own axis to effect simultaneous winding and label application to said plurality of strips of paper, and means operative at the stripping station for stripping the formed container bodies from the mandrel while said mandrel is maintained stationary by said cooperating guide means.

18. A machine of the character described adapted for the formation of container bodies and the like from a web of paper which comprises means for feeding a paper web and winding means therefor including a mandrel assembly frame, a plurality of mandrels rotatably mounted in said frame, means for moving said mandrels through a successive series of operative positions, and means carried by each mandrel for effecting the application of a fluid sealing material to the container formed thereon, and means operable in a predetermined position of each mandrel for applying the application of said sealing material to the container.

19. A machine of the character described adapted for the formation of containers and the like which comprises means for feeding a plurality of strips of paper, a mandrel for receiving said paper strips and simultaneously winding the same into container form, reservoir means on said mandrel for holding a quantity of fluid sealing material, and controllable means operable upon completed formation of said containers for discharging a fluid spray of said sealing material from said reservoir upon the inner seams of said containers.

20. A machine of the character described adapted for the formation of containers and the like from a web of paper which comprises means for feeding a paper web, mandrel means for receiving and winding said paper web into container form, means for moving said mandrel with said wound container thereon through ironing and label applying stations into a stripping station, and means operative in said stripping station to effect application of a sealing fluid spray to the interior seam of said formed container as it is stripped from said forming mandrel, and means for maintaining predetermined relative positioning between said container seam and said spraying means.

21. A machine of the character described adapted for the formation of containers and the like comprising means for feeding a paper web, mandrel means for receiving said paper web and winding the same into container form, said mandrel means including a rotatable mandrel, a plurality of gripper fingers extending above said mandrel, control means for effecting the raising of said gripper fingers for receiving the advancing edge of said paper web, means for effecting dropping of said gripper fingers to effect the gripping of said paper web, means for rotating said mandrel to secure the winding of said paper web into container form, and means providing for the axial turning of said gripper fingers to provide for the stripping of said formed container from said mandrel.

22. A machine of the character described adapted for the formation of container bodies and the like from a web of paper which comprises means for winding the paper web into container form including a rotary mandrel, gripper means for receiving the advancing edge of said paper web and gripping the same, means for rotating said mandrel to effect the winding of said web into container form, said mandrel having an expansible portion adapted to be lowered beneath the cylindrical contour thereof and means for contracting said expansible portion and releasing said gripper fingers to provide for the stripping of said formed container body.

23. A process of the character described for forming container bodies and the like from a web of paper which comprises slitting the paper web into strips adapted to form individual container blanks, simultaneously feeding said blanks forward to a winding station, winding said blanks simultaneously into container form, applying adhesive to the container surface during the winding operation to provide for securing the container in wound form and also providing an outer adhesive surfacing, effecting application of a label to the adhesive coated surface of each of said containers, and thereafter stripping said formed containers in axial direction.

24. A process of the character described for forming container bodies and the like from a web of paper which comprises slitting the paper web into strips adapted to form individual container blanks, simultaneously feeding said blanks forward to a winding station, winding said blanks simultaneously into container form, applying adhesive to the container surface during the winding operation to provide for securing the container in wound form and also providing an outer adhesive surfacing, moving said formed containers from said winding station to an ironing station, subjecting the containers to an ironing action at such station, thereafter moving said containers to a label applying station, and effecting simultaneous application of a label to each of said container bodies at said label applying station.

25. A process of the character described for forming container bodies and the like from a web of paper which comprises slitting the paper web into strips adapted to form individual container blanks, simultaneously feeding said blanks forward to a winding station, winding said blanks simultaneously into container form, applying adhesive to the container surface during the winding operation to provide for securing the container in wound form and also providing an outer adhesive surfacing, moving said formed containers from said winding station to an intermediate station, thereafter moving said containers to a label applying station, and effecting simultaneous application of a label to each of said container bodies at said label applying station, thereafter moving said container bodies to a stripping station, and stripping the container bodies in axial relation at said stripping station.

26. A machine of the character described adapted for the formation of a plurality of container bodies and the like as a continuous operation from a web of paper which comprises means for feeding the web of paper, means for cutting said paper web into a plurality of strips having sharply defined edges, means for feeding a plurality of said strips forward in parallel relation, a forming mandrel assembly, means in said assembly for receiving simultaneously a plurality of said strips and winding the same into container form, means for transferring the wound container bodies to an ironing station, means for subjecting the plurality of formed containers to an ironing action, means for transferring the container bodies to a label applying station, means for effecting simultaneous application of a label to each of said formed container bodies, means for transferring said containers to a stripping position, and means for effecting stripping of said container bodies in axial relation at said stripping station.

27. A machine of the character described adapted for the formation of container bodies and the like which comprises means for feeding a sheet of paper material, a mandrel assembly having a winding station, a label applying station and a stripping station, means including a mandrel at said winding station for receiving the sheet of paper and winding it into convolute container form leaving inner and outer seams, means for successively moving said mandrel through said winding, label applying and stripping stations, means providing for a predetermined positioning of said inner and outer seams at said label applying and said stripping stations, means at said label applying station for applying a label in predetermined positioning with respect to said container and to said outer seam, means at said stripping station for maintaining said mandrel stationary with said inner seam in predetermined positioning, and means at said latter station for stripping the container from said mandrel while maintaining said inner seam in said predetermined positioning.

28. A machine of the character described for forming container bodies from a sheet of paper material comprising means for slitting said sheet into a plurality of strips, a plurality of mandrel means for receiving said strips and winding the strips in the form of container bodies, means supporting said mandrels for movement through a succession of operative positions, means for feeding said strips to said mandrel means for winding directly thereon in one of said operative positions of the mandrels, means for applying adhesive to said strips during the winding thereof on said mandrels to provide for securing the containers in wound form and to provide adhesive on the outer surface of the container bodies, label applying means for applying a label directly to said adhesively coated outer surface of the wound container bodies in another position of said mandrels, means for stripping said container bodies from the mandrels in still another position, and drive means for effecting predetermined timed movement of said mandrels through said successive positions and effecting coordinated rotation of said mandrels when at certain of said positions.

29. A machine of the character described for forming container bodies from a sheet of paper material comprising means for slitting the sheet into a plurality of strips, a plurality of mandrel means for receiving said strips and winding the strips into the form of container bodies, means supporting said mandrels for movement through a succession of operative positions including a winding station, a label applying station and a stripping station, means for feeding said strips to said mandrel means for winding directly thereon at said winding station, means for applying adhesive to said strips during the winding thereof on said mandrels to provide for securing the container in wound form, means at said label applying station for applying a label directly to the wound container bodies, means at said stripping station for stripping said container bodies from the mandrels, and drive means for effecting predetermined timed movement of said mandrels through said successive operative positions and for effecting coordinated rotation of said mandrels when at certain of said stations.

30. In a machine of the character described adapted for the formation of container bodies and the like having a completely impervious interior from a web of paper provided with a surfacing material adapted to provide said impervious interior and having means for feeding a web of paper and means for winding the paper web into the form of a container body, the combination of slitting means which comprises a shaft rotatably mounted in transverse relation with respect to said web of paper, a plurality of driving means mounted in spaced relation on said shaft and adapted to rotate therewith, a series of cutter blades removably mounted upon said shaft for driving engagement by said respective driving means to effect the slitting of said paper web into strips to be received in said winding means, said cutter blades providing for unfrayed and sharply defined edges on the paper web received by said winding means to provide for sealing the ends of the formed container and avoid wicking.

31. In a machine of the character described adapted for the formation of container bodies and the like having a completely impervious interior from a web of paper provided with a surfacing material adapted to provide said impervious interior and having means for feeding the paper web and means for winding the paper web into the form of container bodies, the combination of slitting means which comprises a shaft extending transversely with respect to said paper web, a plurality of supporting and driving means mounted in spaced relation on said shaft and adapted to rotate therewith, a series of split annular cutting blades adapted to be placed over said shaft and to be engaged respectively with said driving means, and means for rotating said shaft, said cutting blades providing for unfrayed and sharply defined edges on the paper web received by said winding means, to provide for sealing the ends of the formed container and avoid wicking.

32. In a process of the character described for forming container bodies and the like having an impervious interior from a sheet of paper having a surfacing material thereon adapted to provide said impervious interior, the steps which comprise intermittently feeding a sheet of said paper material, bending over the trailing end of said sheet during periods of non-feeding and while the sheet is maintained stationary in such manner as to cause the end to tend to curl toward the side of the sheet having said surfacing material thereon while maintaining the impervious character of said surfacing material, and winding said sheet into the form of a container body having said surfacing material on the interior thereof, said bending operation facilitating the retention of the container in wound form.

33. In a process of the character described for forming container bodies and the like having a completely impervious interior from a sheet of paper having a surfacing material thereon adapted to provide said impervious interior, the steps which comprise feeding a sheet of said paper material, bending the trailing end of said sheet in such manner as to cause the end to tend to curl towards the side of the sheet having said surfacing material thereon while maintaining the impervious character of said surfacing material, winding said sheet into the form of a container body having said surfacing material on the interior thereof, applying adhesive to the container surface during the winding operation to secure the container in wound form and provide adhesive on the exterior surface thereof, and applying a label to said adhesively coated exterior surface, said bending operation facilitating the retention of the container in wound form and application of a label thereto.

34. A machine of the character described adapted for the formation of containers and the like comprising means for feeding a web of paper, means including a plurality of mandrels for receiving the paper web and winding the same into container form, means for moving said mandrels through a plurality of successive stations including a winding station and a label applying station, means for applying adhesive to said web during the winding thereof on said mandrels at said winding station to secure the containers in wound form and provide adhesive on the exterior surface thereof, and means at said label applying station for applying a label to each of said containers utilizing the adhesive applied to the outside of said container body at said winding station.

35. A process of the character described for forming container bodies and the like from a sheet of paper material which comprises feeding a sheet of paper to a winding mandrel, winding said sheet on said mandrel into the form of a container body, applying adhesive to said sheet while on said mandrel to secure the container in wound form, continuing the adhesive application to provide adhesive on the exterior surface thereof, and applying a label to the adhesively coated exterior surface of said formed container body.

36. A machine of the character described adapted for the formation of container bodies and the like from a web of paper which comprises means for feeding a paper web and winding means therefor including a mandrel assembly frame, a plurality of mandrels rotatably mounted in said frame, means for rotating said frame to move said mandrels through a successive series of operating stations, means operative in certain of said stations to impart a predetermined rotation to said mandrels, and means including a guide track for normally retaining the mandrels in predetermined operative positioning in the mandrel assembly frame and providing for dropping one end of the mandrels to a clearance position at one of said stations to provide for stripping the formed container therefrom.

37. A machine of the character described adapted for the formation of container bodies and the like from a web of paper which comprises means for feeding a paper web and winding means therefor including a mandrel assembly frame, a plurality of mandrels rotatably mounted in said frame, means for rotating said frame to move said mandrels through a successive series of operating stations, means operative in certain of said stations to impart a predetermined rotation to said mandrels, supporting means positioned adjacent the ends of said mandrels for normally retaining the mandrels in predetermined operative positioning in the mandrel assembly frame, said supporting means including a guide track providing for dropping one end of the mandrels to a clearance position at one of said stations to provide for stripping the formed container therefrom, auxiliary supporting means carried by said assembly frame and positioned intermediate the ends of the mandrels for limiting the drop of the mandrels at said operating station and supporting the end of the mandrels in said clearance position with respect to said normal supporting means and the guide track, and cam means on said guide track for restoring the ends of said mandrels to said normal operative positioning in the frame upon subsequent rotation of the frame.

38. A machine of the character described adapted for the formation of container bodies and the like from a web of paper which comprises means for feeding a paper web and winding means therefor including a frame for said machine, a mandrel assembly rotatably mounted in said frame, a plurality of mandrels rotatably mounted in said mandrel assembly, means for rotating said mandrel assembly to move said mandrels through a series of successive operating positions, a driving lug on each of said mandrels, a rotatable head at a plurality of said stations for receiving said driving lug and effecting rotation of the mandrels thereat, and a slotted guide track for receiving said driving lugs and maintaining continuous control over the mandrels during rotation of said mandrel assembly, said guide track being mounted on said frame and providing a continuous path between said winding heads.

39. A machine of the character described adapted for the formation of containers and the like comprising means for feeding a paper web, mandrel means for receiving said paper web and winding the same into container form, means for successively moving said mandrel means through a plurality of stations including a winding station, a label applying station and a stripping station, a plurality of gripper fingers carried by said mandrel and adapted to extend above the mandrel at said winding station to receive the advancing edge of said paper web therebeneath, means including a control member extending axially of said mandrel for effecting operation of said gripper fingers, means at said winding station for moving said control member to effect the lowering of said gripper fingers and the clamping of said paper web therebeneath, and means operable during movement of said mandrel means from said label applying station to said stripping station and from said stripping station to said winding station for causing return movement of said control member to effect release of said gripper fingers at said stripping station to provide for axial turning of the gripper fingers and stripping of the formed container from the mandrel and to effect a return movement of the gripper fingers and the raising thereof at the winding station.

40. A machine of the character described for the forming of container bodies from a jumbo roll of paper material as a continuous operation comprising means for unwinding said roll and advancing a web of paper forwardly, cut-off means for severing said web into lengths suitable for winding into container form, means for slitting said web into a plurality of strips, a mandrel assembly frame rotatably mounted on said machine, a plurality of mandrels rotatably mounted in said assembly frame, power drive means for periodically rotating said frame to sequentially move said mandrels through a plurality of successive operating positions providing for the simultaneous and cyclic performance of a plurality of operations requiring a comparable period of time for the completion thereof, said operations including the winding of the paper strips into container form, the direct application of labels to the formed containers and the stripping of the formed containers from the mandrels, means coordinated with the movement of said mandrel frame and including said power drive means for effecting a predetermined rotation of said mandrels at certain of said operating positions, coordinated means for effecting the stripping of the containers at the stripping position, means for feeding the cut lengths of paper strips onto said mandrels for winding directly on the mandrel at the winding position, means connected with said power drive means for intermittently operating said unwinding and said feeding means in coordinated timed relation with the movement of said assembly frame and the operation of the mandrel at the winding position to provide for successively feeding sheets into position to be wound on the mandrel which occupies the winding position, and means for effecting operation of said cut-off means during periods of stoppage of said unwinding and feeding means.

41. A machine of the character described and adapted for the continuous formation of a plurality of container bodies from a jumbo roll of paper comprising a plurality of mandrels mounted for successive movement into a winding station, means for intermittently unwinding a predetermined length of paper from said roll, cut-off means operable during dwell of said unwinding means for severing said paper into lengths suitable for winding on said mandrels into the form of container bodies, means operable upon completion of said cut-off operation for successively feeding said severed lengths to a mandrel at said winding station, means on said mandrels for receiving and retaining the leading end of the severed lengths of paper as said lengths are fed to the mandrel at the winding station, drive means coordinated with the operation of said feed means for successively moving said mandrels into said winding station in predetermined timed sequence and for effecting predetermined rotation of the mandrel at said station to provide for completely winding said lengths into the form of container bodies thereat, and means for coordinating the operation of said unwinding means with the operation of said drive means and said feed means to provide a predetermined dwell in the operation of said unwinding means following operation of said cut-off means to effect a predetermined spacing between successive severed lengths of paper providing for the feeding and complete winding of one of said severed lengths and the movement of a successive mandrel into said winding station prior to the feeding of a succeeding severed length of paper to a mandrel at the winding station.

42. In a machine of the character described adapted for the formation of container bodies and the like having a completely impervious interior from a web of paper provided with a surfacing material adapted to provide said impervious interior and having means for feeding a web of paper and means for winding the paper web into the form of a container body, the combination of means for slitting said web of paper into a plurality of blanks having a dimension corresponding to the height of the container, said means including a thin rotatable blade and a stationary die cooperating with and receiving said blade, and means for rotating said blade at a peripheral speed greater than the speed at which the web of paper is advanced by the feeding means to provide unfrayed and sharply defined edges on the blanks providing for the sealing of the ends of the formed container and avoid wicking.

43. A machine of the character described for simultaneously forming a plurality of container bodies from paper material comprising means for feeding said paper material, means for receiving the paper material and providing for simultaneously forming the same into a plurality of convolute container bodies having inner and outer seams including a rotatable mandrel assembly frame, a plurality of mandrels rotatably mounted in said frame, means on each of said mandrels for receiving and retaining an end edge of said paper material in fixed predetermined angular positioning with respect to the mandrel, means for rotating said assembly frame to successively move said mandrels into a sequence of operative positions, means for individually controlling each of said mandrels to maintain continuous control over the angular positioning thereof and to provide for selective rotation or non-rotation of the mandrel in accordance with the position occupied by it in the sequence of operative positions, means coordinated with the operation of said assembly frame rotating means for effecting said selective rotation of the individual mandrels, and a member movable with respect to each of the mandrels when at a non-rotating position for stripping the formed container bodies with the inner seams thereof maintained in predetermined angular positioning.

44. A machine of the character described for forming container bodies from relatively heavy paper material comprising means for winding a sheet of said relatively heavy paper into convolute tubular form having a smooth uniform exterior surface over the main portion thereof and leaving an outer seam at which there is a substantial change in the contour of the outer surface, means for securing the tube in wound form, means for moving said tube to a label applying station, means at said station for applying a label of relatively light weight material such as tends to conform to the contour of said exterior surface and said outer seam of said tube, and means for establishing a predetermined angular positioning of said tube and said outer seam relative to the label at said label applying station to provide for the application of said label with its ends positioned in the zone of said outer seam and its main body portion supported on said smooth exterior surface of the tube.

45. A machine of the character described for forming container bodies and the like from paper material comprising means for winding a sheet of paper into tubular form including a rotary mandrel, gripper means for receiving the advancing edge of the paper sheet and gripping the same, means for rotating said mandrel to effect the winding of said sheet into tubular form, means including a control member extending into and movable with respect to said mandrel for effecting the operation of said gripper means, said mandrel having an expansible portion adapted to be lowered beneath the contour of the mandrel to provide for the stripping of the formed tube, and means including said control member for effecting the lowering and raising of said expansible portion of the mandrel.

LINO SCUSA.
RUDOLPH KILIAN.